US008166745B2

(12) United States Patent
Seiter et al.

(10) Patent No.: US 8,166,745 B2
(45) Date of Patent: May 1, 2012

(54) TOOL FOR EXTRACTING AND INSERTING PINS OF ROLLER CHAINS

(75) Inventors: Jay Seiter, Boston, MA (US); Matthew Bracken, West Roxbury, MA (US)

(73) Assignee: Starwinn Cycle Corporation, Tainan (TW)

( * ) Notice: Subject to any disclaimer, the term of this patent is extended or adjusted under 35 U.S.C. 154(b) by 97 days.

(21) Appl. No.: 12/793,825

(22) Filed: Jun. 4, 2010

(65) Prior Publication Data

US 2010/0307126 A1 Dec. 9, 2010

Related U.S. Application Data

(60) Provisional application No. 61/184,526, filed on Jun. 5, 2009.

(51) Int. Cl.
*B23P 19/04* (2006.01)
*B21L 21/00* (2006.01)

(52) U.S. Cl. ................................................ 59/7; 29/257

(58) Field of Classification Search .................. 59/7, 11; 29/257

See application file for complete search history.

(56) References Cited

U.S. PATENT DOCUMENTS

| | | | | |
|---|---|---|---|---|
| 2,826,893 | A * | 3/1958 | Falk et al. | 59/7 |
| 5,140,736 | A | 8/1992 | Hsiao | |
| 6,748,637 | B2 | 6/2004 | Meggiolan | |
| 7,082,747 | B2 * | 8/2006 | Oishi et al. | 59/7 |
| 7,254,935 | B1 * | 8/2007 | Huang | 59/7 |
| 7,409,817 | B1 * | 8/2008 | Huang | 59/7 |
| 2003/0022747 | A1 | 1/2003 | Meggiolan | |

* cited by examiner

*Primary Examiner* — David Jones

(74) *Attorney, Agent, or Firm* — Lathrop & Gage LLP; Steven M. Mills, Esq.

(57) ABSTRACT

A tool for inserting and extracting pins of roller chains includes a body having a bridge adapted to engage a chain and a drive screw assembly coupled to the main body on a first side of the bridge. The drive screw assembly includes a drive screw which is rotatable to provide a force and a pin mounted concentrically within the drive screw. The drive screw assembly further includes an alignment sleeve that surrounds the pin mounted concentrically within the drive screw. The alignment sleeve guides and supports the pin up to a face of a roller chain. The tool further includes a rotatable backing wheel coupled to the main body on a second side of the bridge. The rotatable backing wheel includes multiple channels such that the multiple channels correspond to different roller chains having different sizes.

23 Claims, 38 Drawing Sheets

TOOL FOR EXTRACTING AND INSERTING PINS OF ROLLER CHAINS

RELATED APPLICATIONS

This application claims the benefit of U.S. Provisional Patent Application No. 61/184,526, filed Jun. 5, 2009, the content of which is incorporated herein by reference in its entirety.

TECHNICAL FIELD

The present inventive concept is related to a tool for extracting and inserting pins of roller chains. More particularly, the present inventive concept is related to a tool for extracting and inserting pins of roller chains having a backing wheel to adapt the tool to multiple bicycle chains and a pin support sleeve to support a pin component.

BACKGROUND

Chain tools are used to insert and remove a chain pin from a roller chain. A conventional chain tool has a bridge feature to hold a roller chain, a backing wall to support a roller chain, a pin used to extract or insert the pin of the chain and a drive screw in which the pin is mounted and which is rotated to provide a force used in extracting or inserting the chain pin.

The conventional chain tools cannot accommodate chains of different internal and external widths, and cannot prevent the pin of the chain tool from bending or snapping due to high loads experienced during use. When using the conventional chain tools, the broken pins are caused by misalignment during operation. The misalignment may be caused by poor positioning of the roller chain in the bridge or from the difficulties in keeping the pin of the conventional chain tool concentric to the drive screw during manufacture and during use. The conventional chain tools have a fixed spacing between the backing wall and the bridge. To account for chains of different widths, namely, single-speed chains, eight-speed chains, nine-speed chains, ten-speed chains, and eleven-speed chains, for example, the conventional chain tools have a bridge that is much more narrow than the internal width of the chain. The addition of ten-speed and eleven-speed chains has stressed the systems having the narrow bridge. A tool having a bridge that is narrower than the internal width of the chain is not precise enough to handle the high tolerance chains. This is because the narrow bridge allows the chain to sit misaligned with the pin and backing wall which leads to damage of the chain or to the pin of the tool. Additionally, the narrow bridge is weak and would likely be damaged if the tool was dropped.

The pin of the conventional chain tools is very susceptible to bending and breaking. This is because the pin is supported only axially and can easily wander on a misaligned chain. This combined with increased press forces required for ten-speed and eleven-speed chains renders the conventional pin system unable to prevent failure. Thus, the conventional chain tools suffer from breakage of tool pin components and incompatibility with chains of varying sizes.

SUMMARY

Exemplary embodiments of the present inventive concept are directed to a chain tool which improves upon the functionality and compatibility of the conventional chain tools. Specifically, the chain tool of the exemplary embodiments of the present inventive concept includes a pin support sleeve, or alignment sleeve, to support a pin component to reduce or eliminate breakage of the pin and includes an anvil wheel adapted to fit multiple bicycle chains.

In accordance with an aspect of the present inventive concept, a tool for inserting and extracting pins of roller chains includes a body having a bridge adapted to engage a chain and a drive screw assembly coupled to the main body on a first side of the bridge. The drive screw assembly includes a drive screw which is rotatable to provide a force used in extracting or inserting a pin of a roller chain and a pin mounted concentrically within the drive screw. The tool further includes a rotatable backing wheel coupled to the main body on a second side of the bridge. The rotatable backing wheel includes multiple channels such that the multiple channels correspond to different roller chains having different sizes.

In one exemplary embodiment, the rotatable backing wheel includes a first channel providing spacing for a first roller chain of a first size, a second channel providing spacing for a second roller chain of a second size and a third channel providing spacing for a third roller chain of a third size. In another exemplary embodiment, the rotatable backing wheel includes a solid anvil provided to flare a pin of the third roller chain.

In one exemplary embodiment, the tool further includes a ball and a spring, and the rotatable backing wheel includes multiple detents on a first side of the rotatable backing wheel for receiving the ball such that the rotatable backing wheel is rotatable to multiple indexed positions.

In one exemplary embodiment, the bridge includes a magnet.

In one exemplary embodiment, the drive screw assembly further includes an alignment sleeve mounted concentrically within the drive screw, wherein the alignment sleeve surrounds the pin. In another exemplary embodiment, the alignment sleeve guides and supports the pin up to a face of a roller chain. In another exemplary embodiment, the pin is rotatable relative to the drive screw and alignment sleeve. In another exemplary embodiment, the alignment sleeve is movable axially relative to the drive screw and has limited outward movement from the drive screw assembly. In another exemplary embodiment, the alignment sleeve is limited from moving inward in the drive screw assembly by an alignment sleeve return spring.

In one exemplary embodiment, the pin is fixed to the drive screw coupling the motion of the pin and the drive screw.

In accordance with another aspect of the present inventive concept, a tool for inserting and extracting pins of roller chains includes a body having a bridge adapted to engage a chain and a drive screw assembly coupled to the main body. The drive screw assembly includes a drive screw which is rotatable to provide a force used in extracting or inserting a pin of a roller chain, a pin mounted concentrically within the drive screw, and an alignment sleeve mounted concentrically within the drive screw, wherein the alignment sleeve surrounds the pin.

In one exemplary embodiment, the alignment sleeve guides and supports the pin up to a face of a roller chain.

In one exemplary embodiment, the pin is rotatable relative to the drive screw and alignment sleeve.

In one exemplary embodiment, the alignment sleeve is movable axially relative to the drive screw and has limited outward movement from the drive screw assembly.

In one exemplary embodiment, the alignment sleeve is limited from moving inward in the drive screw assembly by an alignment sleeve return spring.

In one exemplary embodiment, the pin is fixed to the drive screw coupling the motion of the pin and the drive screw.

In one exemplary embodiment, the bridge includes a magnet.

BRIEF DESCRIPTION OF DRAWINGS

The foregoing and other features and advantages of the inventive concept will be apparent from the more particular description of preferred embodiments of the inventive concept, as illustrated in the accompanying drawings in which like reference characters refer to the same parts throughout the different views. The drawings are not necessarily to scale, emphasis instead being placed upon illustrating the principles of the inventive concept.

FIG. 2G is a schematic perspective view of a portion of a roller chain of FIGS. 2A, 2B and 2C with a master pin installed.

DETAILED DESCRIPTION

Figure 1A:
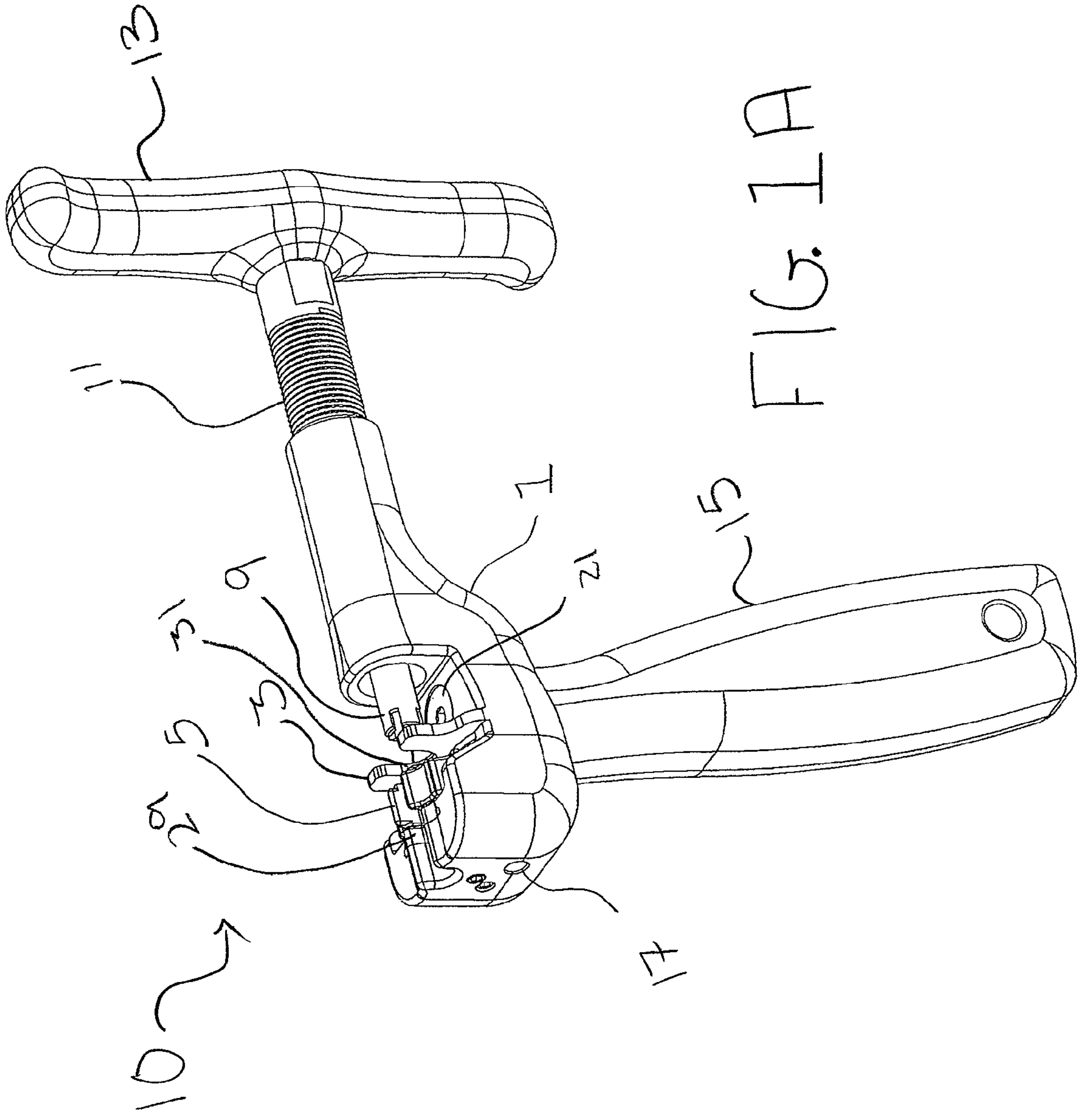
FIG. 1A is a schematic perspective view of a chain tool, in accordance with an exemplary embodiment of the present inventive concept.

Various exemplary embodiments will be described more fully hereinafter with reference to the accompanying drawings, in which exemplary embodiments are shown. The present inventive concept may, however, be embodied in many different forms and should not be construed as limited to the exemplary embodiments set forth herein.

It will be understood that when an element is referred to as being “on,” “connected to” or “coupled to” another element, it can be directly on, connected or coupled to the other element or intervening elements may be present. In contrast, when an element is referred to as being “directly on,” “directly connected to” or “directly coupled to” another element, there are no intervening elements present. Like numerals refer to like elements throughout. As used herein, the term “and/or” includes any and all combinations of one or more of the associated listed items.

It will be understood that, although the terms first, second, third, etc. may be used herein to describe various elements, components, regions, layers and/or sections, these elements, components, regions, layers and/or sections should not be limited to these terms. These terms are only used to distinguish the element, component, region, layer or section from another element, component, region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for each of description to describe one element's and/or feature's relationship to another element(s) and/or feature(s) as illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. Thus, the exemplary term "below" can encompass both an orientation above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes or regions illustrated herein but are to include deviations in shapes that result, for example, from manufacturing. Thus, the elements illustrated in the figures are schematic in nature and their shapes are not intended to illustrate the actual shape of an element and are not intended to limit the scope of the present inventive concept.

The chain tool of the present exemplary embodiments is used to extract and insert pins of a bicycle chain, for example, a roller chain. The chain tool includes a pin support sleeve, or alignment sleeve, to support the pin component of the chain tool to reduce or eliminate breakage and incorporates an anvil wheel, or backing wheel, which is adapted to fit multiple bicycle chains of different sizes. The chain tool of the exemplary embodiments of the present inventive concept is a single tool which may be utilized to install and remove pins of a bicycle chain on single through eight, nine, ten and eleven-speed chains. For eleven-speed chains, the chain tool may also be utilized to flare a roller pin as required.

Figure 1B:
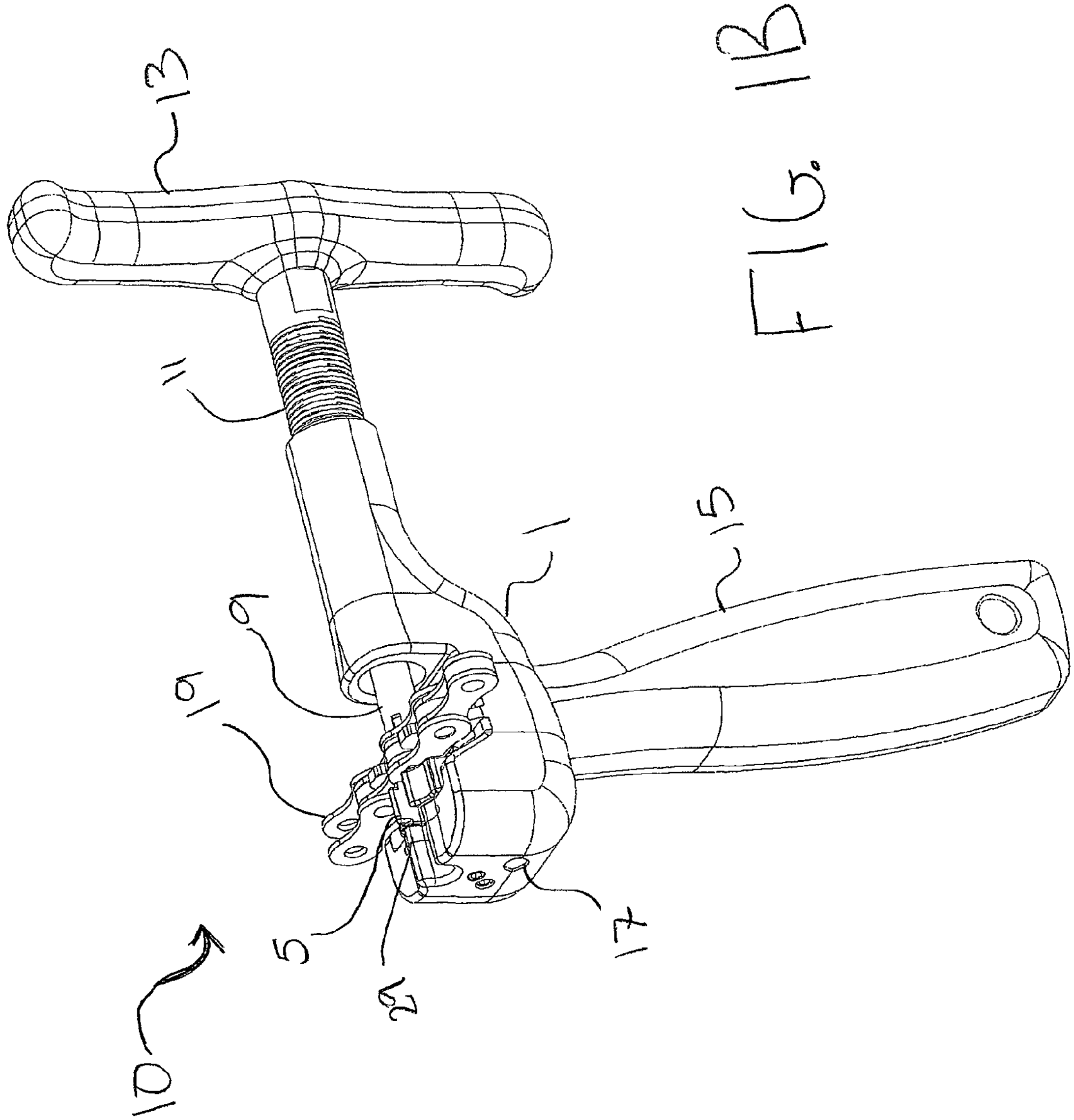
FIG. 1B is a schematic perspective view of a portion of a roller chain coupled to the chain tool of FIG. 1A, in accordance with an exemplary embodiment of the present inventive concept.
Figure 1C:
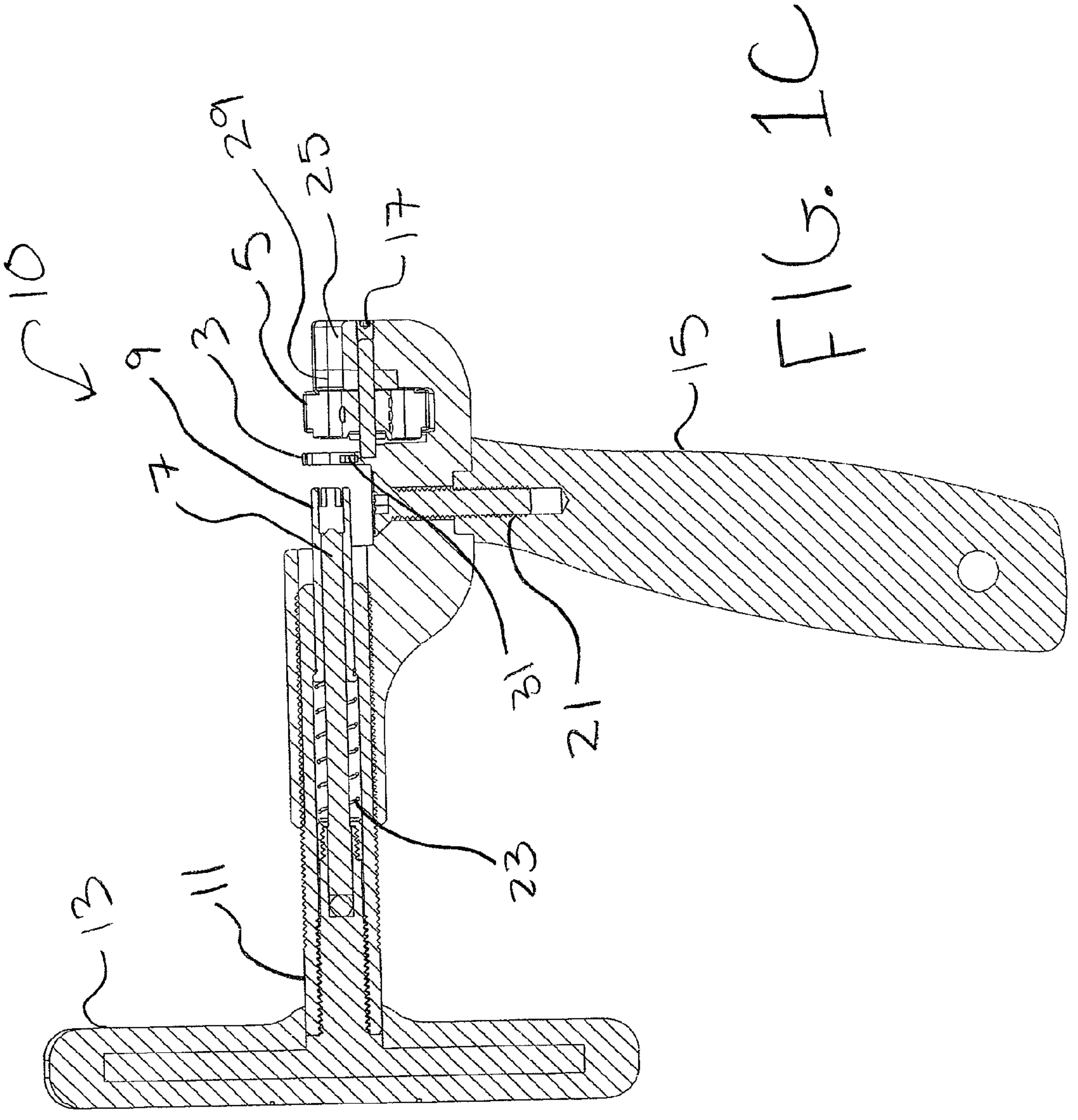
FIG. 1C is a schematic cross-sectional view of the chain tool of FIG. 1A, in accordance with an exemplary embodiment of the present inventive concept.
Figure 1D:
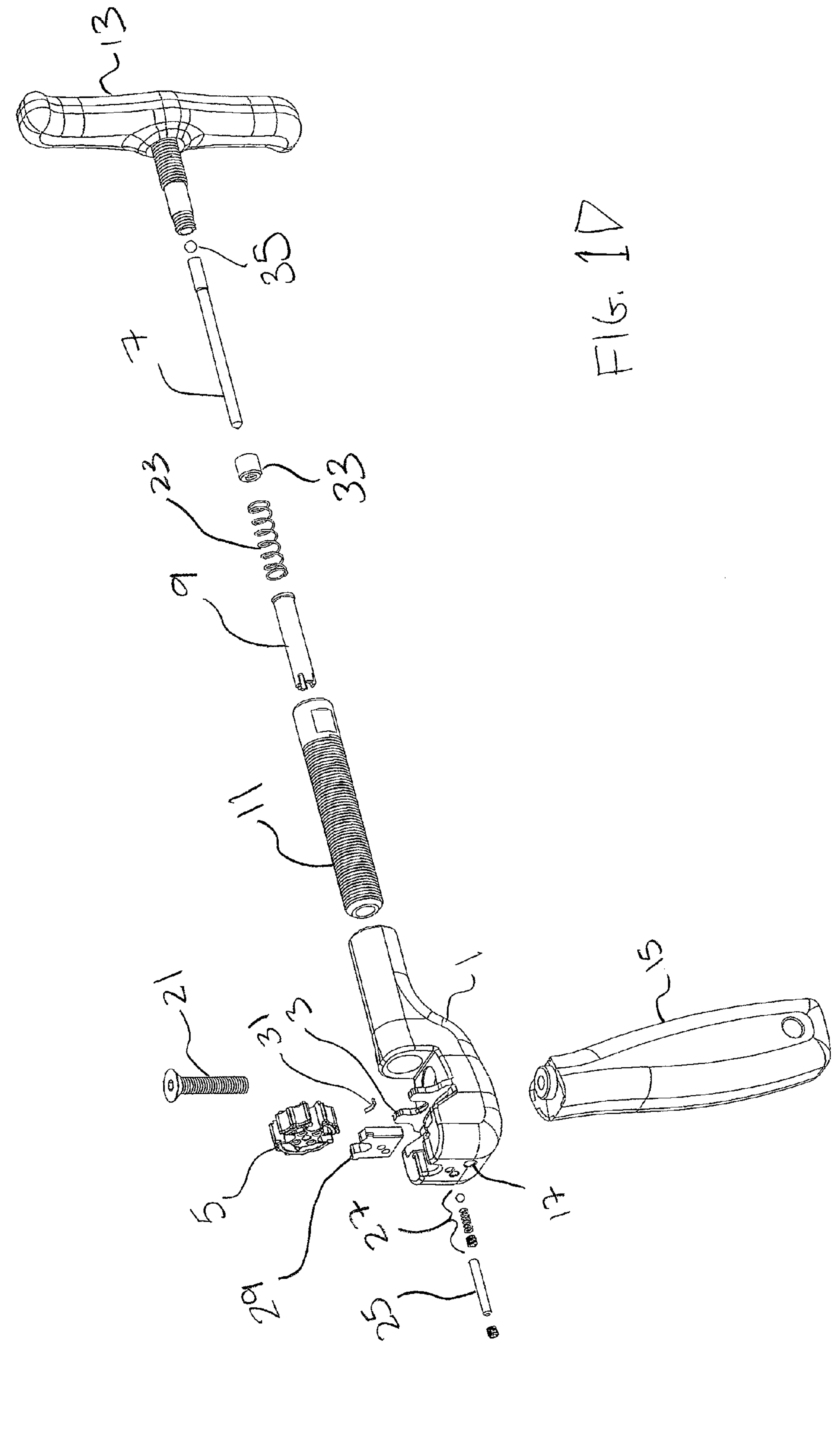
FIG. 1D is a schematic exploded view of the chain tool of FIG. 1A, in accordance with an exemplary embodiment of the present inventive concept.

FIG. 1A is a schematic perspective view of a chain tool 10 in accordance with an exemplary embodiment of the present inventive concept. FIG. 1B is a schematic perspective view of a portion of a roller chain 19 coupled to the chain tool 10 of FIG. 1A, in accordance with an exemplary embodiment of the present inventive concept. FIG. 1C is a schematic cross-sectional view of the chain tool 10 of FIG. 1A, in accordance with an exemplary embodiment of the present inventive concept. FIG. 1D is a schematic exploded view of the chain tool 10 of FIG. 1A, in accordance with an exemplary embodiment of the present inventive concept.

Referring to FIGS. 1A-1D, the chain tool 10 includes a main body structure 1 and a bridge 3 integrated or attached to the main body 1 to hold a roller chain 19. The bridge 3 includes a magnet 31, as described hereinafter. The chain tool 10 further includes an anvil wheel, or backing wheel, 5 to support the roller chain 19 during pin extraction or insertion, a pin 7 used to extract or insert the pin of the chain 19, and a drive screw 11 threaded into the main body 1.

The anvil wheel 5 is located behind the bridge 3. The anvil wheel 5 has multiple anvil features, and an anvil wheel axle 25 is formed through an opening in the anvil wheel 5, as described hereinafter. The anvil wheel 5 is rotated to indexed positions using ball detent components 27. An anvil alignment insert 29 is located behind the anvil wheel 5.

The pin 7 is mounted in the drive screw 11. When the drive screw 11 is rotated, a force is provided, which is used to extract or insert the chain pin. A drive handle 13 is connected to the drive screw 11 to provide leverage for a user to turn the drive screw 11. An alignment sleeve 9 is positioned concentrically within the drive screw 11 and surrounds the pin 7, as described hereinafter. An alignment sleeve return spring 23 inside the drive screw 11 limits inward motion of the alignment sleeve 9. A pin retention cap 33 retains the pin 7 to the handle 13. A pin bearing ball 35 is positioned between the handle 13 and the pin 7.

A handle 15 is integrated or coupled to the main body 1 for a user to hold the chain tool 10 during use. The handle 15 is coupled to the main body 1 by a handle screw 21.

A hole 17 is formed in the main body 1 and is used to remove a guide from a master pin, as described hereinafter.

Figure 2A:
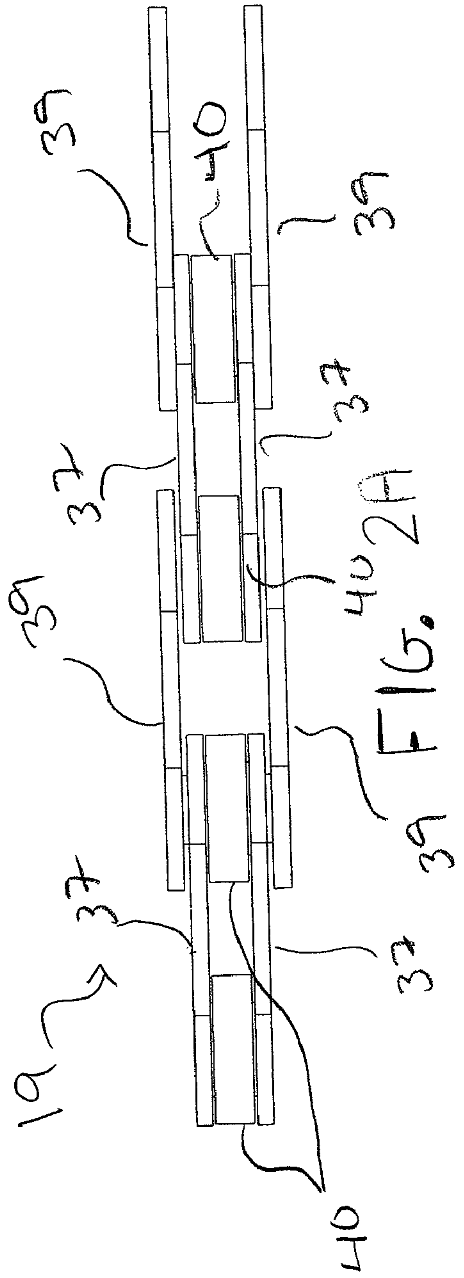
FIGS. 2A, 2B and 2C are schematic perspective views of a portion of a roller chain.
Figure 2B:
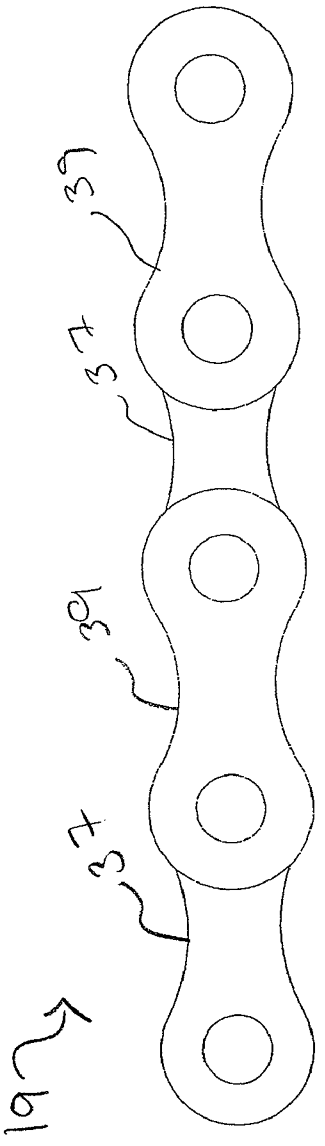
Figure 2C:
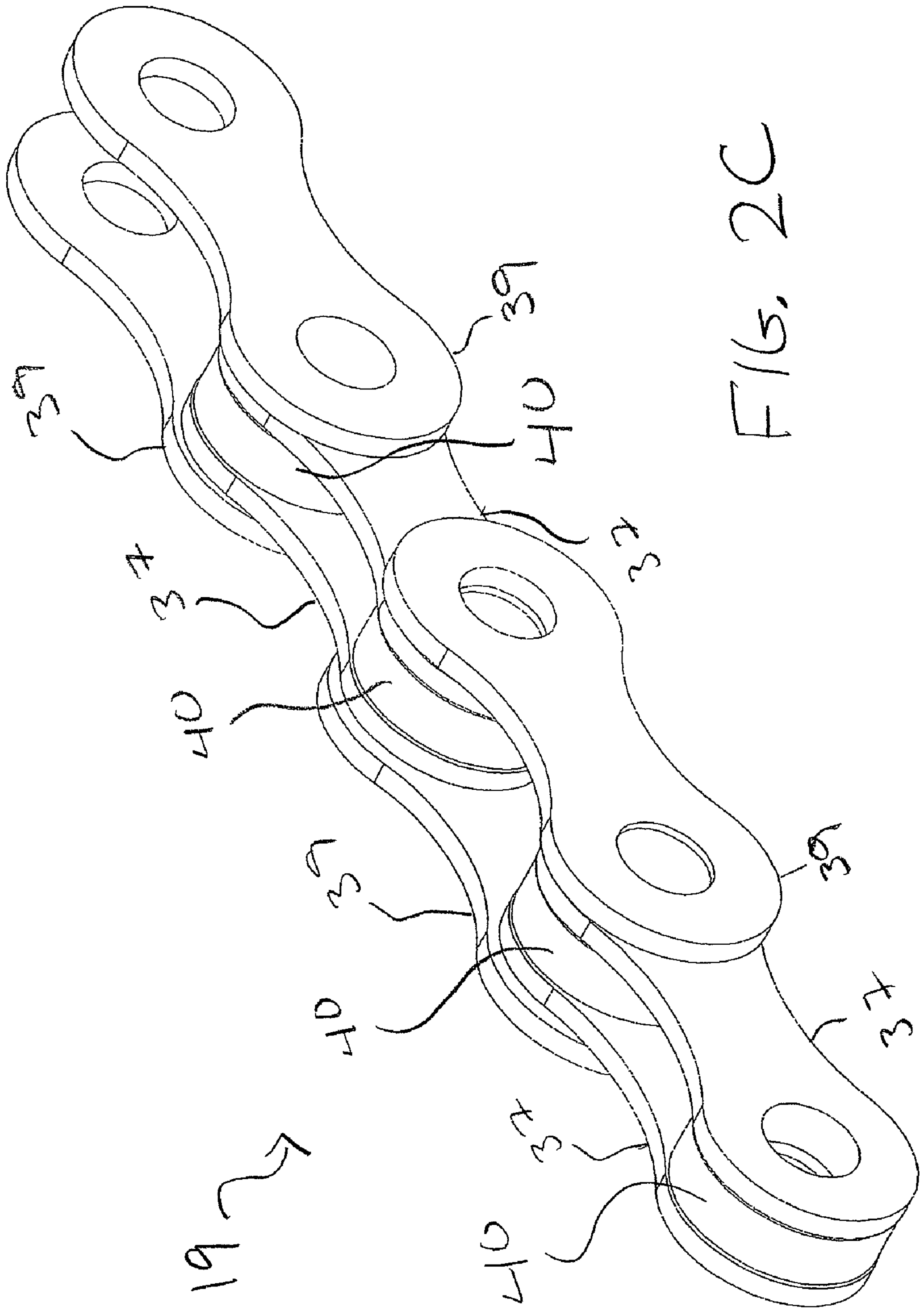
Figure 2D:
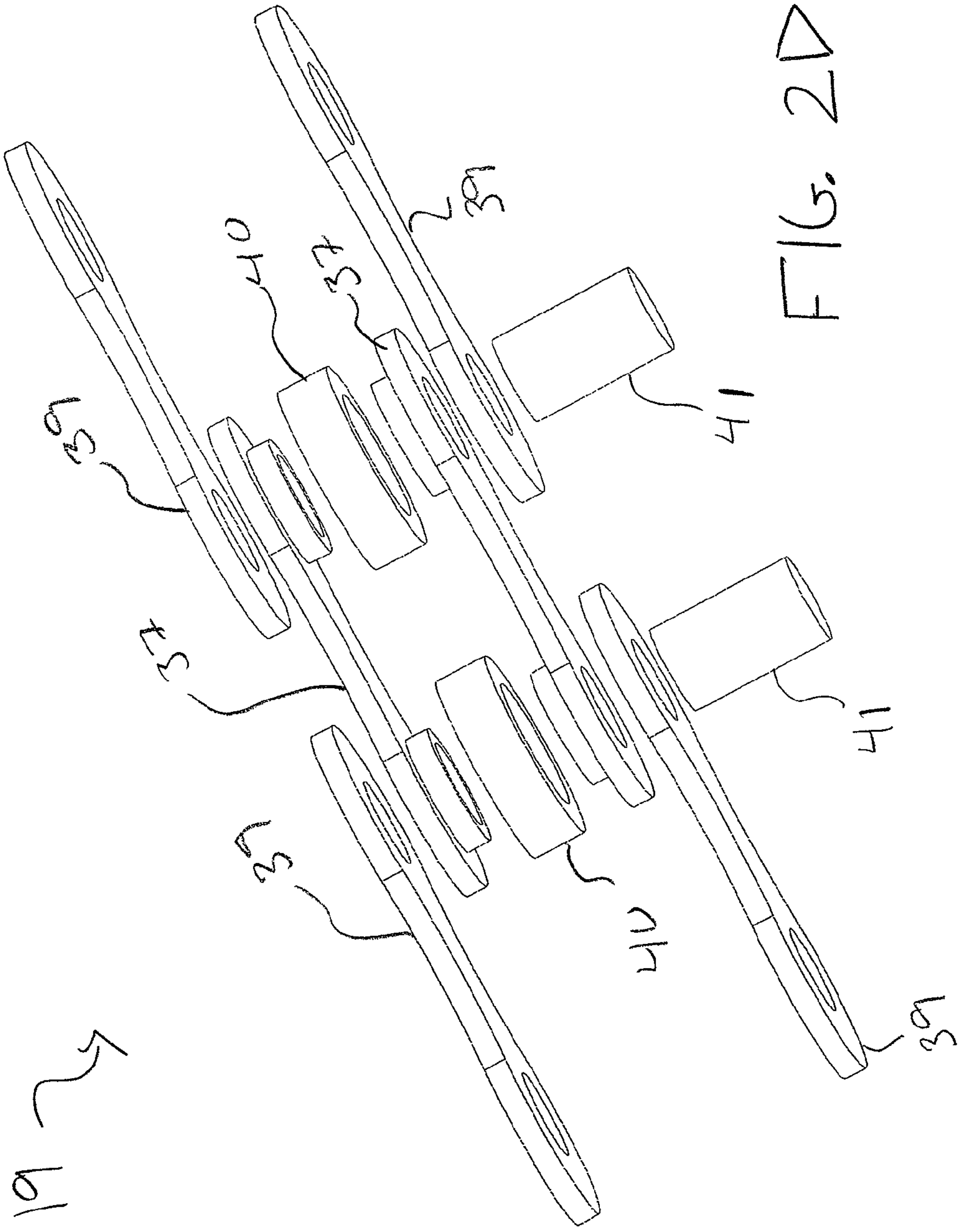
FIG. 2D is a schematic exploded view of a portion of a roller chain of FIGS. 2A, 2B and 2C.

The chain tool 10 is utilized in the installation and removal of a chain. The chain tool 10 is used to mount a roller chain on a bicycle or change the length of the roller chain by removing links and reassembling the roller chain. FIGS. 2A, 2B and 2C are schematic perspective views of a portion of a roller chain 19. FIG. 2D is a schematic exploded view of the portion of the roller chain 19 of FIGS. 2A, 2B and 2C. As illustrated in FIGS. 2A, 2B and 2C, one section of the roller chain 19 includes outer links 39, inner links 37, rollers 40, and master pins 41. The roller chain 19 is assembled by pressing the master pin 41 through the outer link 39, inner link 37 and roller 40 to lock them together. The interface between the master pin 41 and outer links 39 is an interference press fit providing strength to the roller chain 19.

Figure 2E:
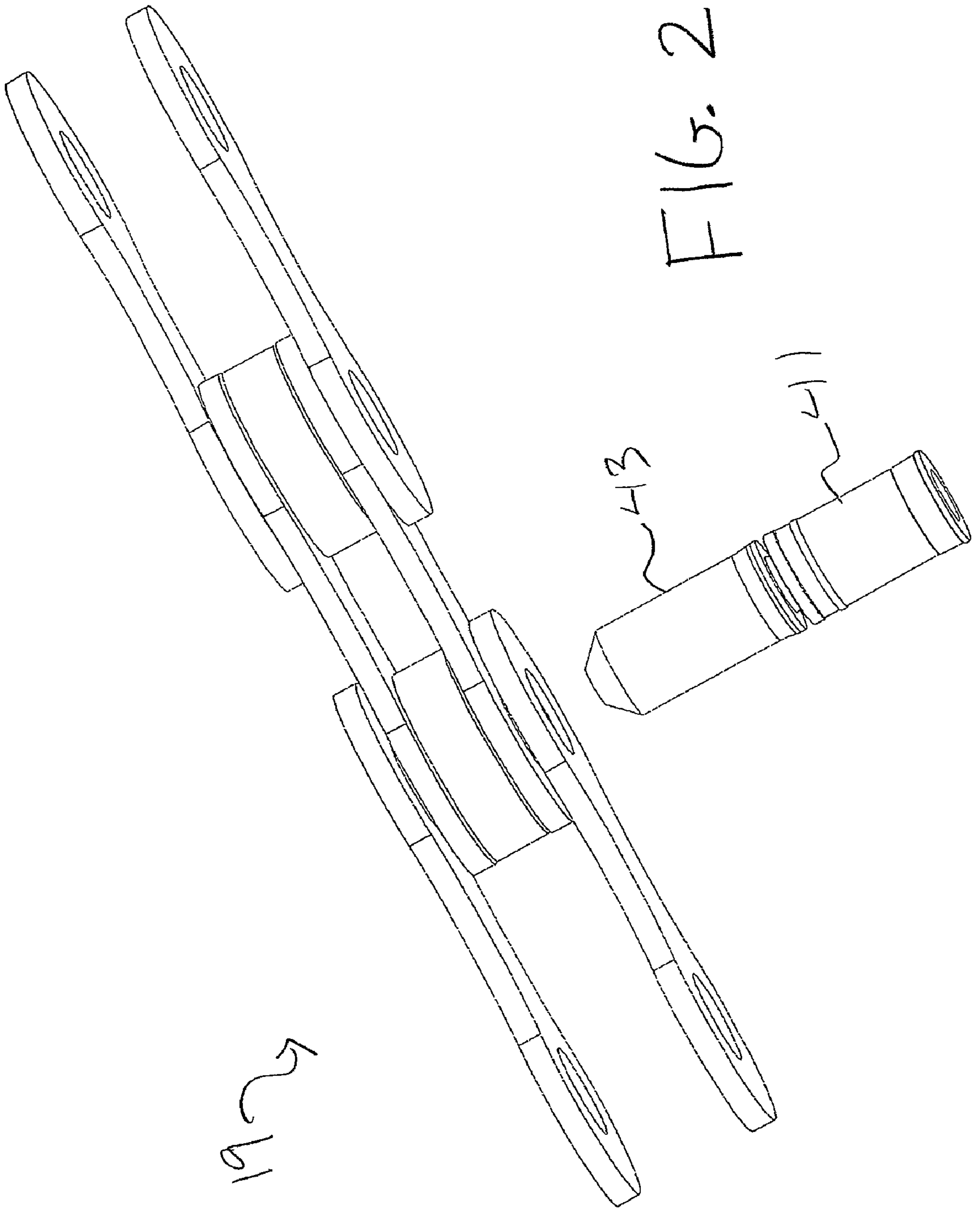
FIG. 2E is a schematic perspective view of a portion of a roller chain of FIGS. 2A, 2B and 2C and a master pin prior to installation.
Figure 2F:
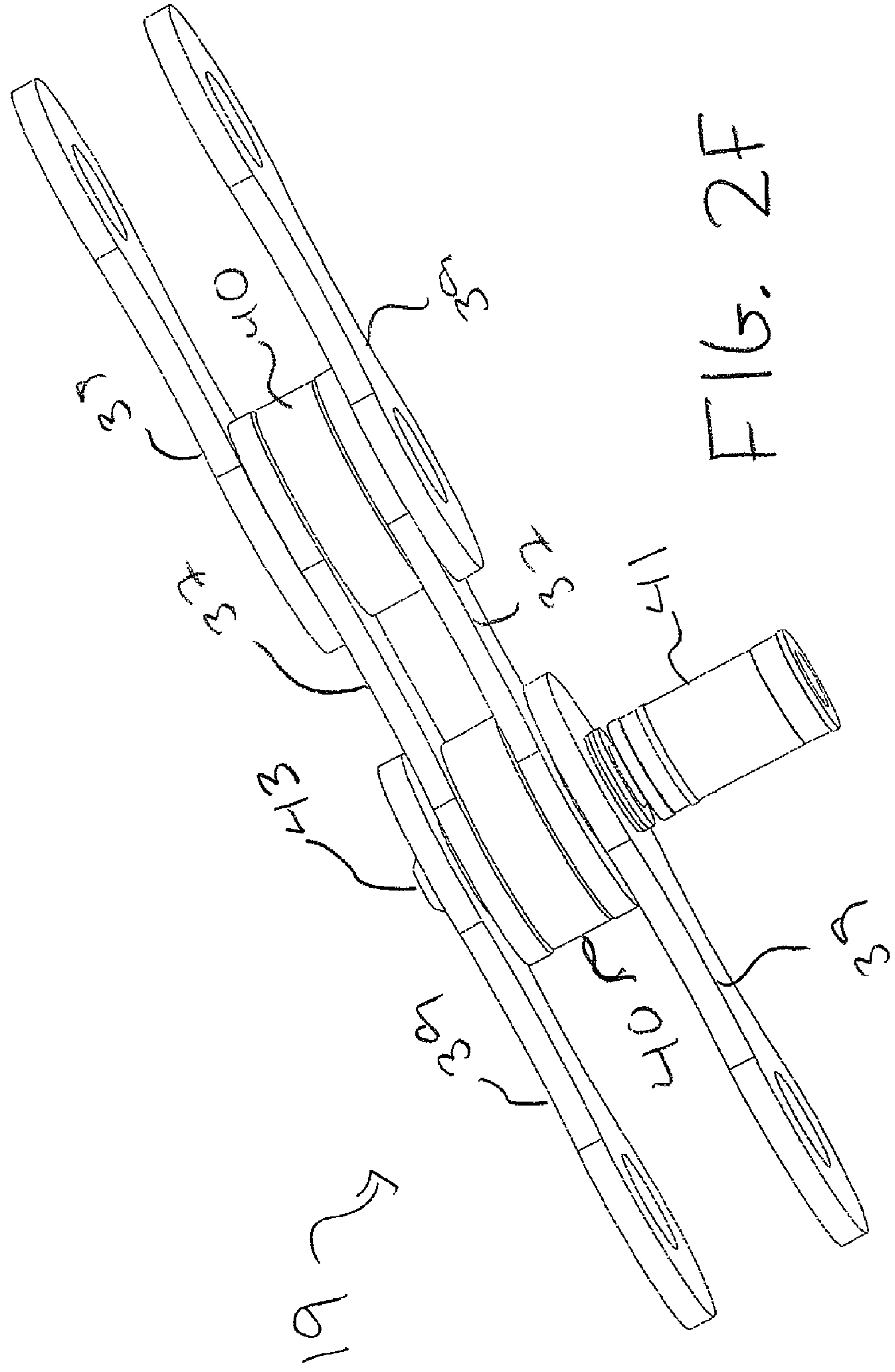
FIG. 2F is a schematic perspective view of a portion of a roller chain of FIGS. 2A, 2B and 2C and a master pin during installation.
Figure 26:
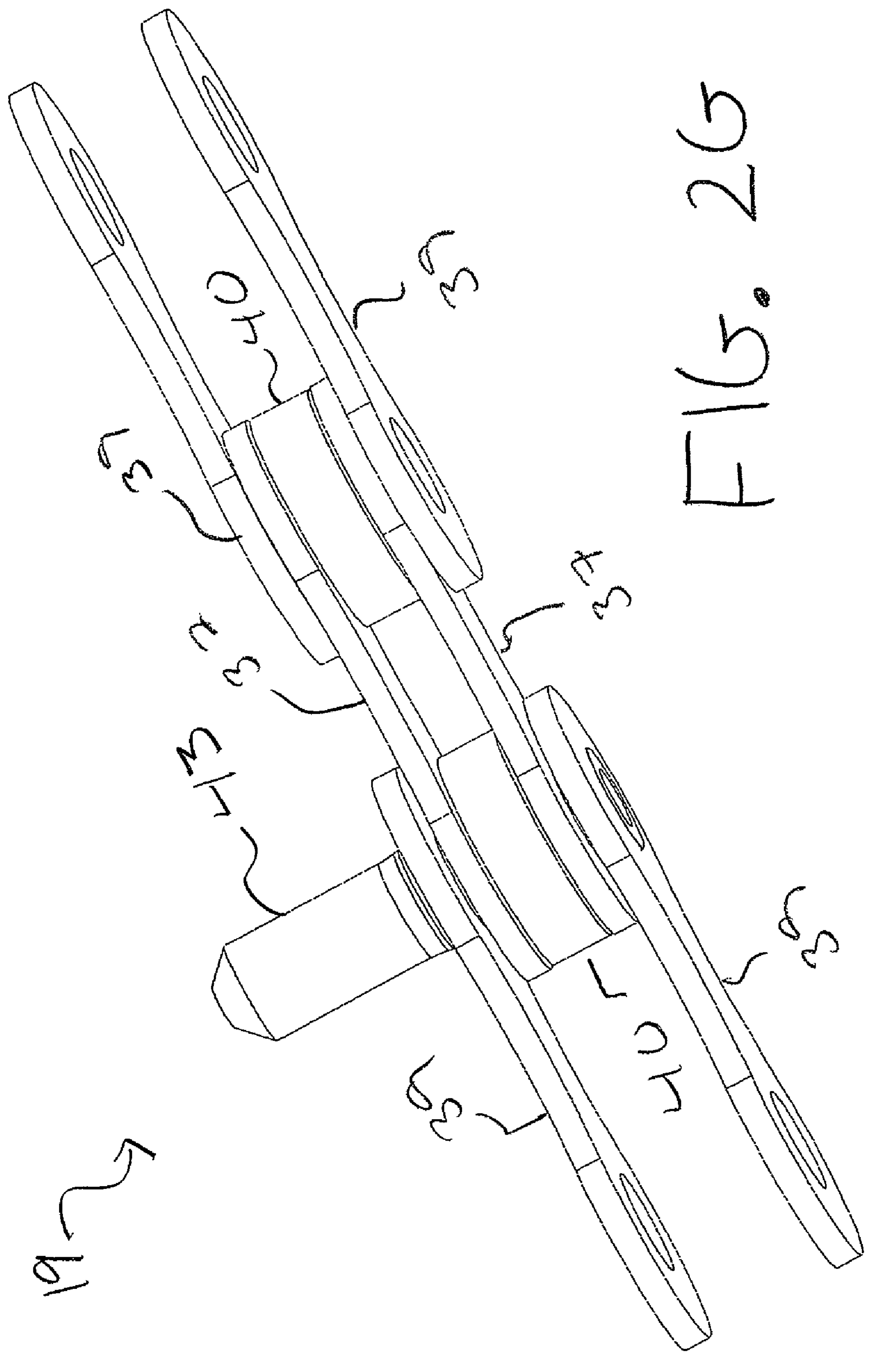

FIG. 2E is a schematic perspective view of the roller chain 19 of FIGS. 2A, 2B and 2C and a master pin 41 prior to installation. The master pin 41 has a separable guide 43 which is used to guide the installation of the master pin 41. FIG. 2F is a schematic perspective view of the roller chain 19 of FIGS. 2A, 2B and 2C and a master pin 41 during installation. In FIG. 2F, the guide 43 is inserted through the outer links 39, the inner links 37 and the roller 40. FIG. 2G is a schematic perspective view of the roller chain 19 of FIGS. 2A, 2B and 2C with the master pin 41 installed. In FIG. 2G, the master pin 41 is inserted between the outer links 39, the inner links 37 and the roller 40, and the guide 43 extends out from a side of the roller chain 19. Once the master pin 41 is pressed into the roller chain 19, the guide 43 is permanently removed leaving the master pin 41 pressed into the outer links 39.

Roller chains for bicycles share a common pitch (distance from roller to roller) of, typically, 0.5 inch. An inner width, an outer width and a link thickness change depending on the use of the chain for single-speed bicycles, eight-speed bicycles, nine-speed bicycles, ten-speed bicycles, and eleven-speed bicycles. Some eleven-speed chains require an additional step during installation. In these chains, after removing the guide 43 from the master pin 41, the end of the master pin 41, where the guide 43 had been, requires an operation where the master pin 41 is flared outward by a special tapered chain tool pin.

The disassembly of the roller chain 19 entails simply pushing any of the pins 41 from the roller chain 19. The force required for this can vary depending on the roller chain. Typically, narrower cycling chains require higher force to remove a master pin 41.

Figure 3A:
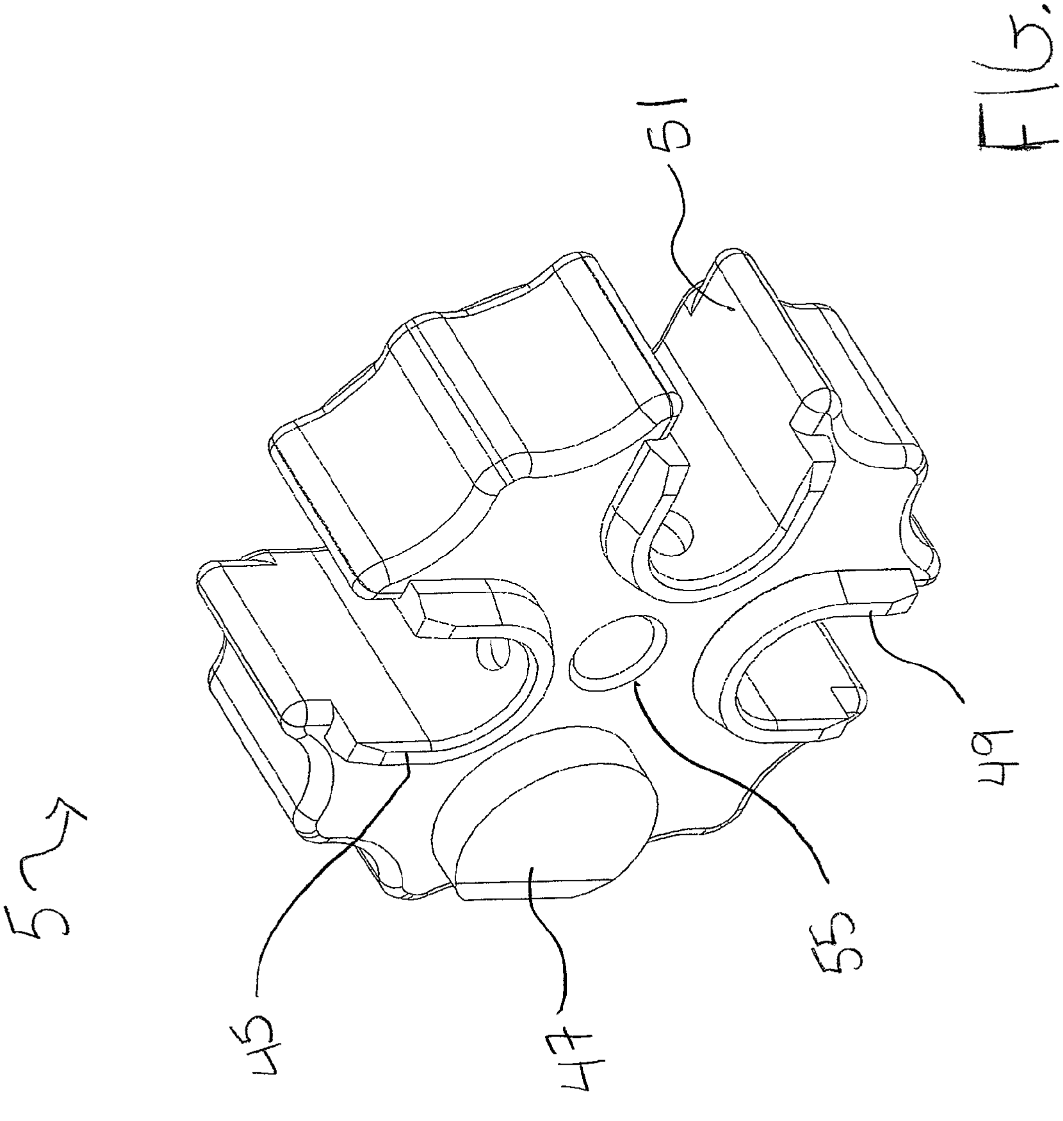
FIG. 3A is a schematic perspective view of a front side of an anvil wheel of the chain tool of FIG. 1A, in accordance with an exemplary embodiment of the present inventive concept.
Figure 3B:
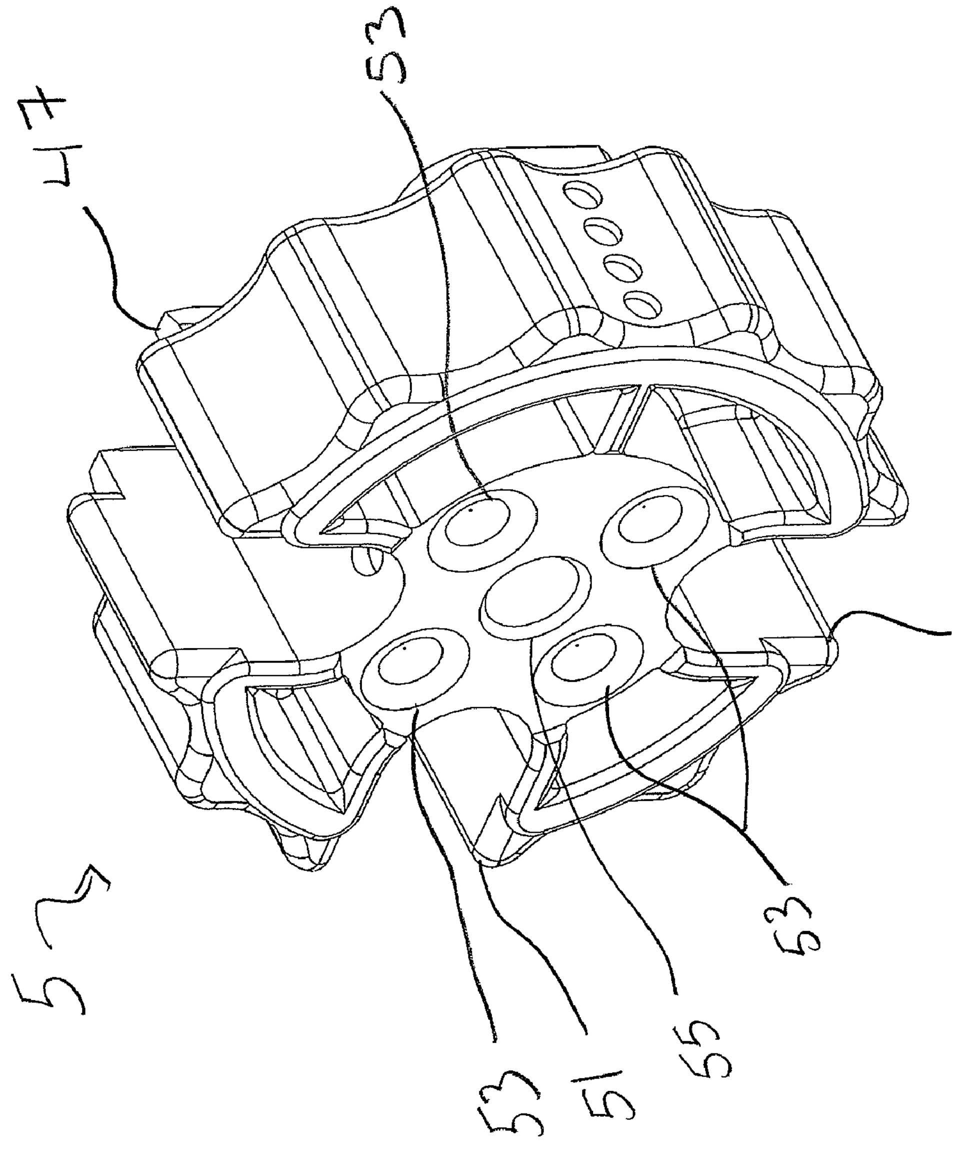
FIG. 3B a schematic perspective view of a back side of an anvil wheel of the chain tool of FIG. 1A, in accordance with an exemplary embodiment of the present inventive concept.

FIG. 3A is a schematic perspective view of a front side of the anvil wheel 5 of the chain tool 10 of FIG. 1A, in accordance with an exemplary embodiment of the present inventive concept. FIG. 3B a schematic perspective view of a back side of the anvil wheel 5 of the chain tool 10 of FIG. 1A, in accordance with an exemplary embodiment of the present inventive concept. The anvil wheel 5 is located behind the bridge 3 of the chain tool 10. The anvil wheel 5 has, for example, four anvil features of different heights or functions which can be accessed by rotating the anvil wheel 5 around the central anvil wheel axle 25 mounted in the main body 1. The anvil wheel 5 may have more than four or fewer than four anvil features. The central anvil wheel axle 25 extends through the anvil wheel 5 through opening 55. Each of the anvils used for extracting and inserting pins has a hole or channel to allow the chain pin 41 to move past the anvil wheel 5. The anvils focus the force onto the link being assembled or disassembled and align the chain 19 perpendicular to the pin 7. In an exemplary embodiment, an eight and nine-speed anvil 49 provides the spacing for eight and nine-speed chains, a ten-speed anvil 51 provides the spacing for ten-speed chains, a eleven-speed anvil 45 provides the spacing for eleven-speed chains, and a eleven-speed flare anvil 47 provides for the locking step required to assemble eleven-speed chains. The anvil wheel 5 is not limited to the eight and nine-speed anvil 49, the ten-speed anvil 51, the eleven-speed anvil 45 or the eleven-speed flare anvil 47. The anvil wheel 5 may accommodate various chain sizes, and thus is not limited to one specific set of sizes or to only cycling roller chains.

Each indexed anvil 49, 51, 45 and 47 is readily accessed with a rotation of the anvil wheel 5 by a thumb or finger of a user, and the current setting of the anvil wheel 5 is marked on the anvil wheel 5. As illustrated in FIG. 3B, the back side of the anvil wheel 5 includes detents 53 for indexing.

Figure 4A:
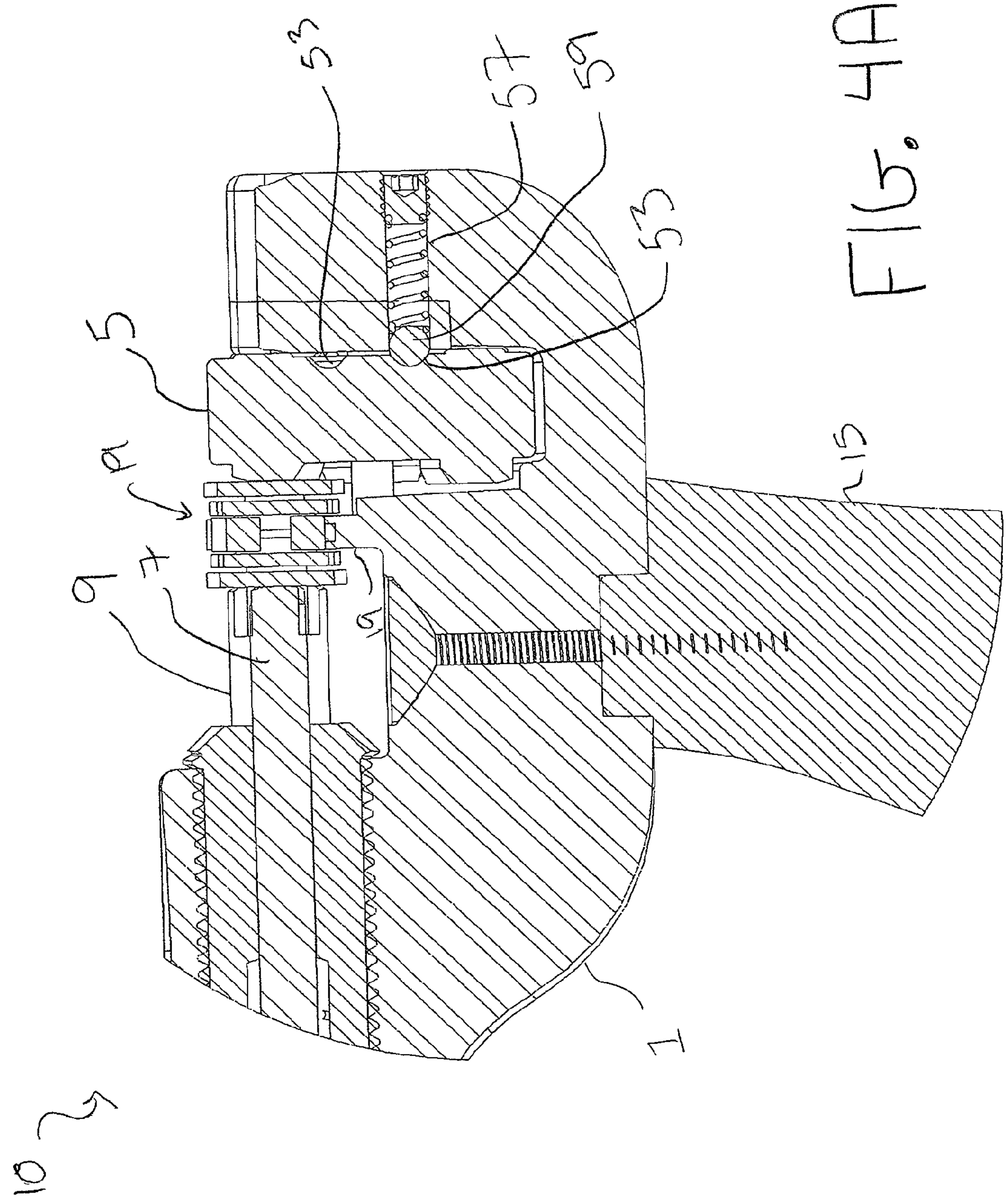
FIG. 4A is a schematic cross-sectional view of a section of the chain tool of FIG. 1A.
Figure 4B:
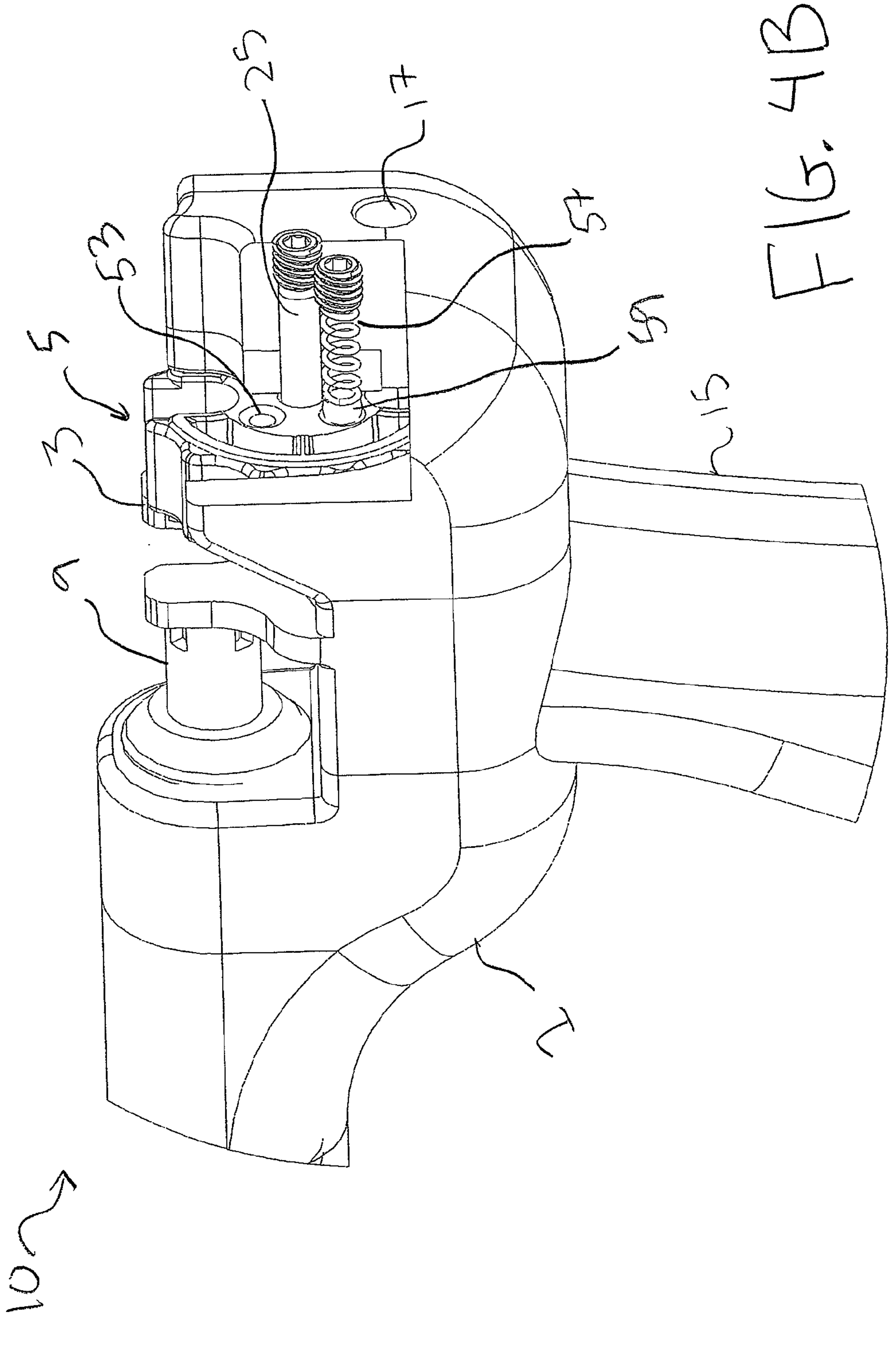
FIG. 4B is a schematic partially cut-away perspective view of the chain tool of FIG. 1A, in accordance with an exemplary embodiment of the present inventive concept.

FIG. 4A is a schematic cross-sectional view of a section of the chain tool 10 of FIG. 1A. FIG. 4B is a schematic partially cut-away perspective view of the chain tool 10 of FIG. 1A, in accordance with an exemplary embodiment of the present inventive concept. As illustrated in FIGS. 4A and 4B, as the anvil wheel 5 is rotated by a user, a ball 59 in one of the detents 53 is moved out of the one of the detents and the ball 59 compresses a spring 57. When another detent 53 is rotated by the ball 59, the spring 57 moves the ball 59 into the other detent 53 and locks the anvil wheel 5 in position.

Figure 5A:
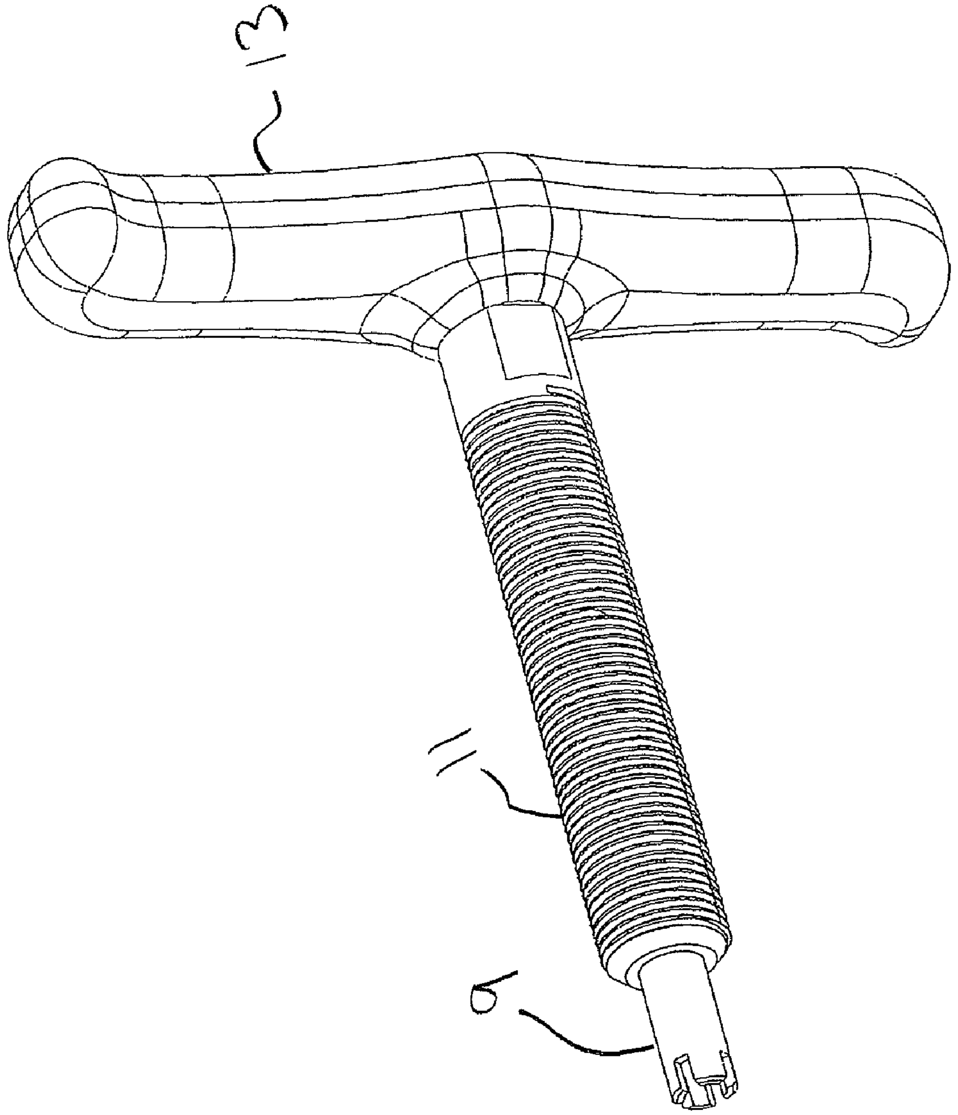
FIG. 5A is a schematic perspective view of a drive screw assembly with an alignment sleeve of the chain tool of FIG. 1A, in accordance with an exemplary embodiment of the present inventive concept.
Figure 5B:
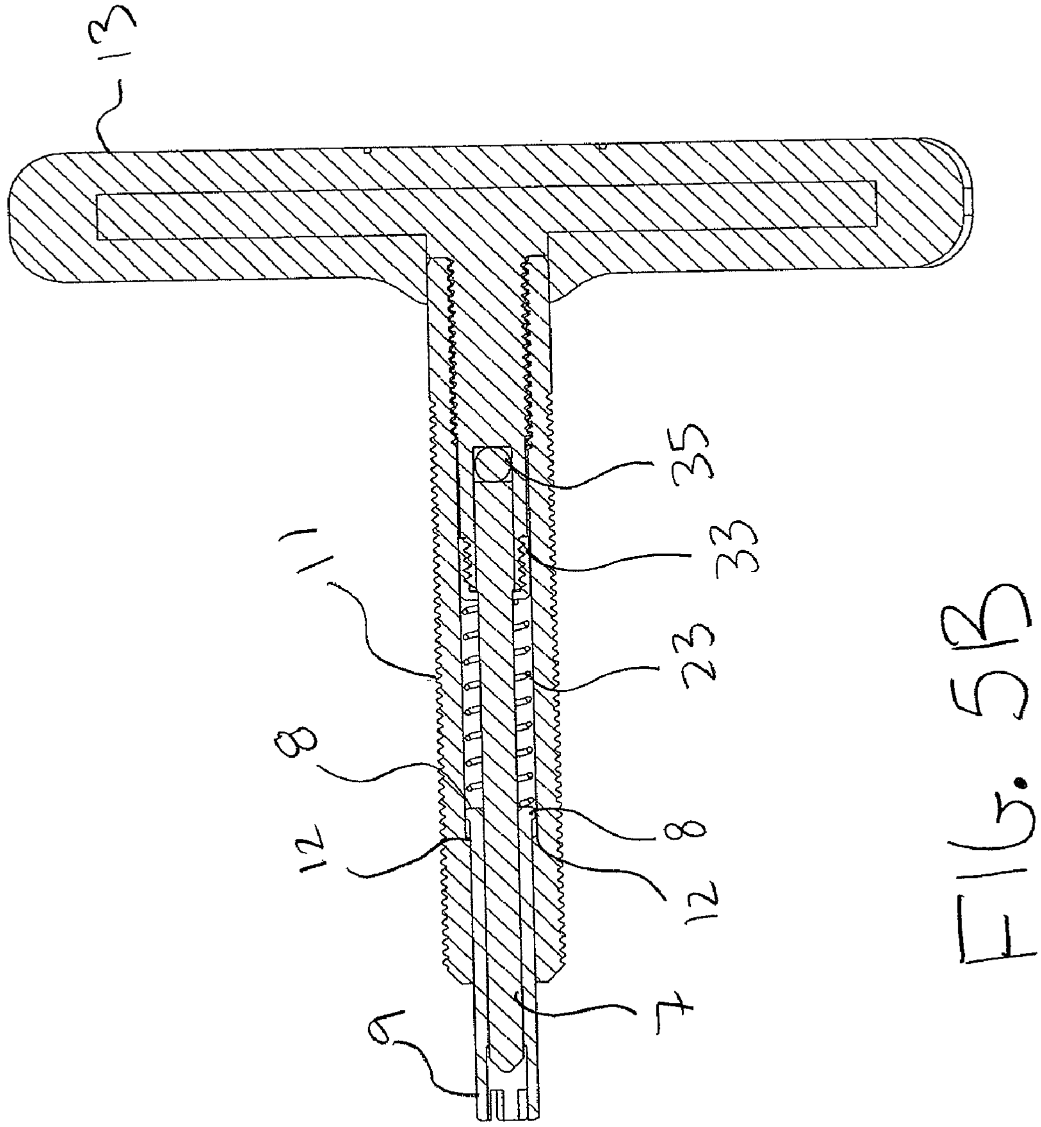
FIG. 5B is a schematic cross-sectional view the drive screw with the alignment sleeve of FIG. 5A, in accordance with an exemplary embodiment of the present inventive concept.

FIG. 5A is a schematic perspective view of the drive screw 11 with the alignment sleeve 9 of the chain tool 10 of FIG. 1A, in accordance with an exemplary embodiment of the present inventive concept. FIG. 5B is a schematic cross-sectional view the drive screw 11 with the alignment sleeve 9 of FIG. 5A, in accordance with an exemplary embodiment of the present inventive concept. The alignment sleeve 9 is positioned concentrically within the drive screw 11 and surrounds the pin 7. The alignment sleeve 9 is able to move axially relative to the drive screw 11 and the pin 7. The alignment sleeve 9 is limited from moving outward by a hard-stop 12 inside the drive screw 11 and is limited from moving inward by the alignment sleeve return spring 23 inside the drive screw 11. The alignment sleeve 9 includes extended portions 8 at an end of the alignment sleeve 9 which interfaces with the alignment sleeve return spring 23. When the extended portions 8 of the alignment sleeve 9 interface with the stops 12 of the drive screw 11, outward motion of the alignment sleeve 9 is stopped. The pin 7 is fixed to the drive screw 11 coupling the motion of the pin 7 and the drive screw 11. The spring-loaded alignment sleeve 9 guides and supports the pin 7 up to the face of the roller chain 19, which minimizes or eliminates breakage or bending of the pin 7. Additionally, the alignment sleeve 9 provides proper chain positioning by surrounding the master pin 41. The pin 7 is able to rotate relative to the drive screw 11 and alignment sleeve 9 which reduces the tendency of the pin 7 to wander on the surface of the roller chain 19.

Figure 6:
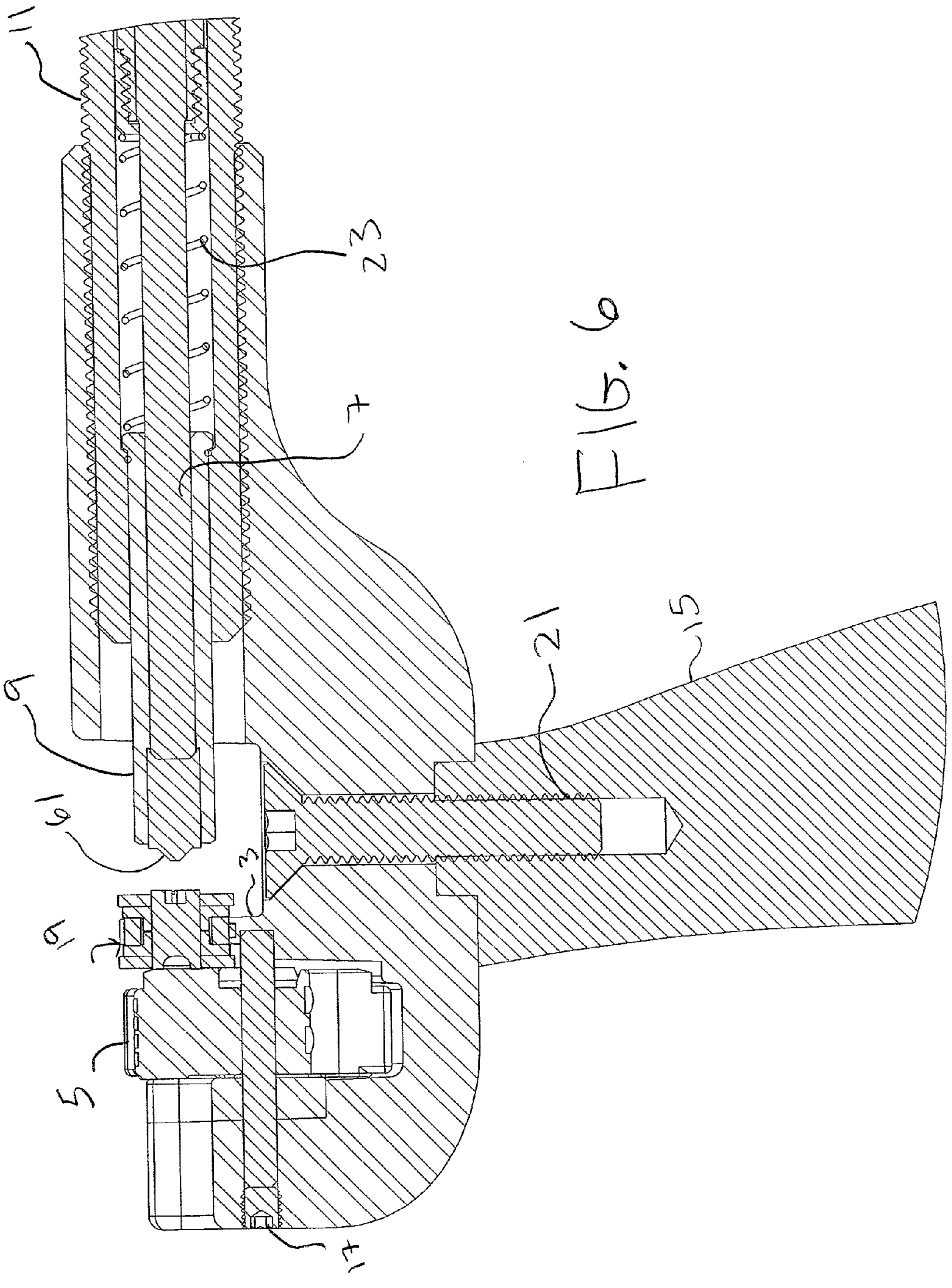
FIG. 6 is a schematic cross-sectional view of a section of the chain tool of FIG. 1A having an installed specialty insert, in accordance with an exemplary embodiment of the present inventive concept.

FIG. 6 is a schematic cross-sectional view of a section of the chain tool 10 of FIG. 1A having an installed specialty insert 61, in accordance with an exemplary embodiment of the present inventive concept. The interaction between the alignment sleeve 9 and the pin 7 permits a specialty insert 61 to be positioned in the end of the alignment sleeve 9 and to be acted on by the pin 7. For example, the specialty insert may be an insert used for the flaring operation used in the assembly of an eleven-speed chain.

Figure 7A:
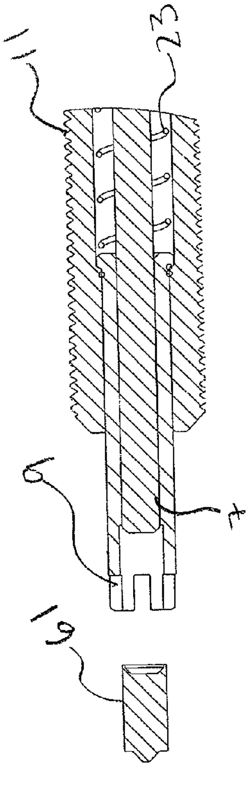
FIG. 7A is a schematic cross-sectional view of a section of the drive screw assembly of FIG. 5A illustrating a specialty insert being installed, in accordance with an exemplary embodiment of the present inventive concept.
Figure 7B:
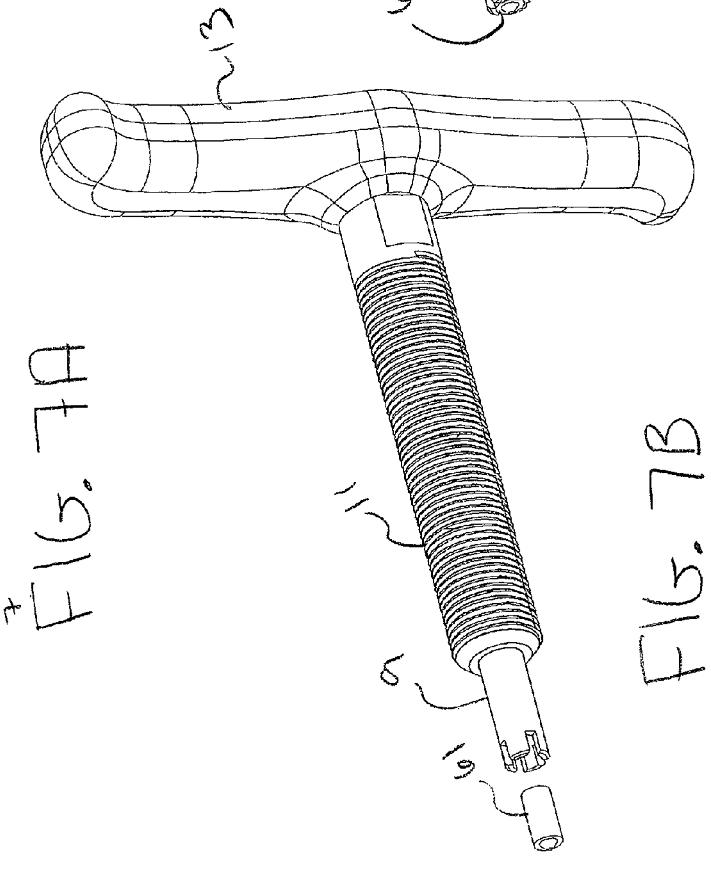
FIG. 7B is a schematic perspective view of the drive screw assembly of FIG. 5A illustrating a specialty insert being installed, in accordance with an exemplary embodiment of the present inventive concept.

FIG. 7A is a schematic cross-sectional view of a section of the drive screw assembly of FIG. 5A illustrating the specialty insert 61 being installed, in accordance with an exemplary embodiment of the present inventive concept. FIG. 7B is a schematic perspective view of the drive screw assembly of FIG. 5A illustrating the specialty insert 61 being installed, in accordance with an exemplary embodiment of the present inventive concept. FIGS. 7A and 7B illustrate the specialty insert 61 as the specialty insert 61 is being inserted into the alignment sleeve 9.

Figure 8A:
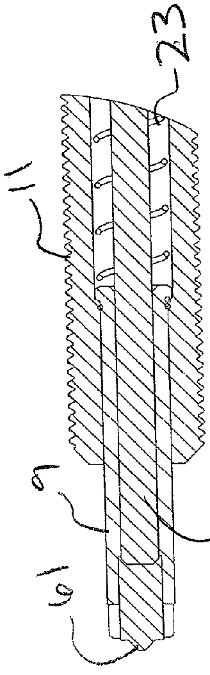
FIG. 8A is a schematic cross-sectional view of a section of the drive screw assembly of FIG. 5A illustrating an installed specialty insert, in accordance with an exemplary embodiment of the present inventive concept.
Figure 8B:
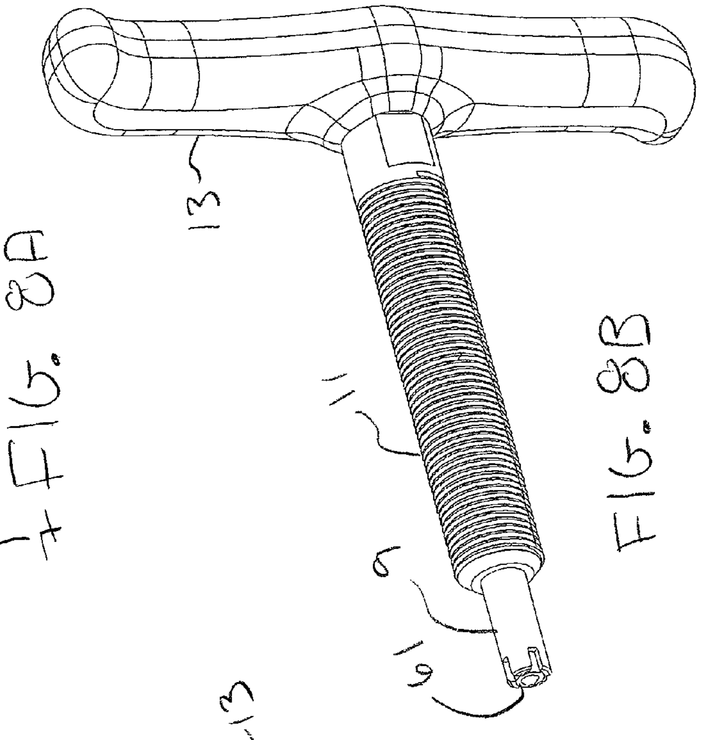
FIG. 8B is a schematic perspective view of the drive screw assembly of FIG. 5A illustrating an installed specialty insert, in accordance with an exemplary embodiment of the present inventive concept.

FIG. 8A is a schematic cross-sectional view of a section of the drive screw assembly of FIG. 5A illustrating the installed specialty insert 61, in accordance with an exemplary embodiment of the present inventive concept. FIG. 8B is a schematic perspective view of the drive screw assembly of FIG. 5A illustrating the installed specialty insert 61, in accordance with an exemplary embodiment of the present inventive concept. FIGS. 8A and 8B illustrate the specialty insert 61 installed in the alignment sleeve and interfacing with the pin 7.

Figure 9A:
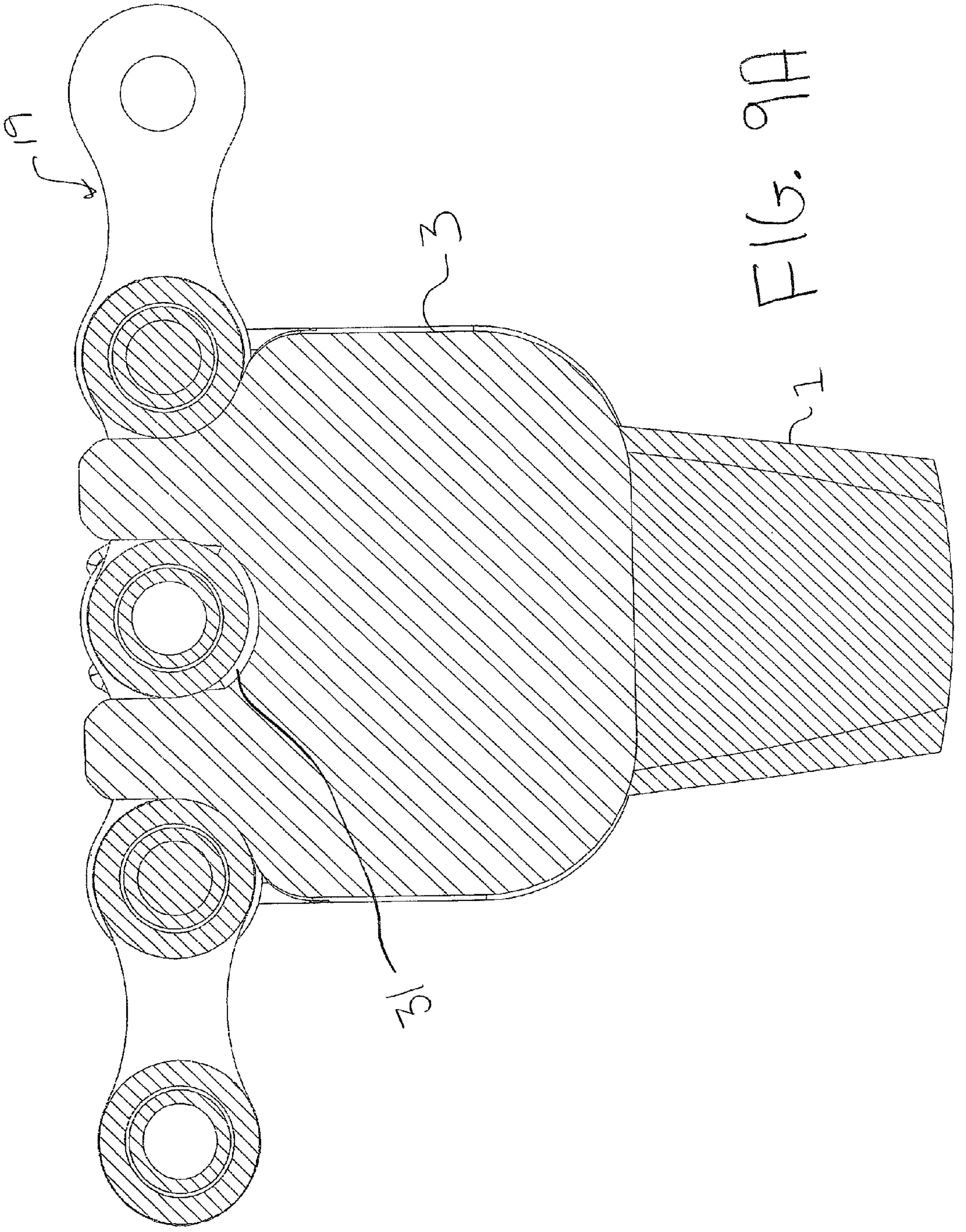
FIG. 9A is a schematic cross-sectional view of a roller chain and a bridge of the chain tool of FIG. 1A, in accordance with an exemplary embodiment of the present inventive concept.
Figure 9B:
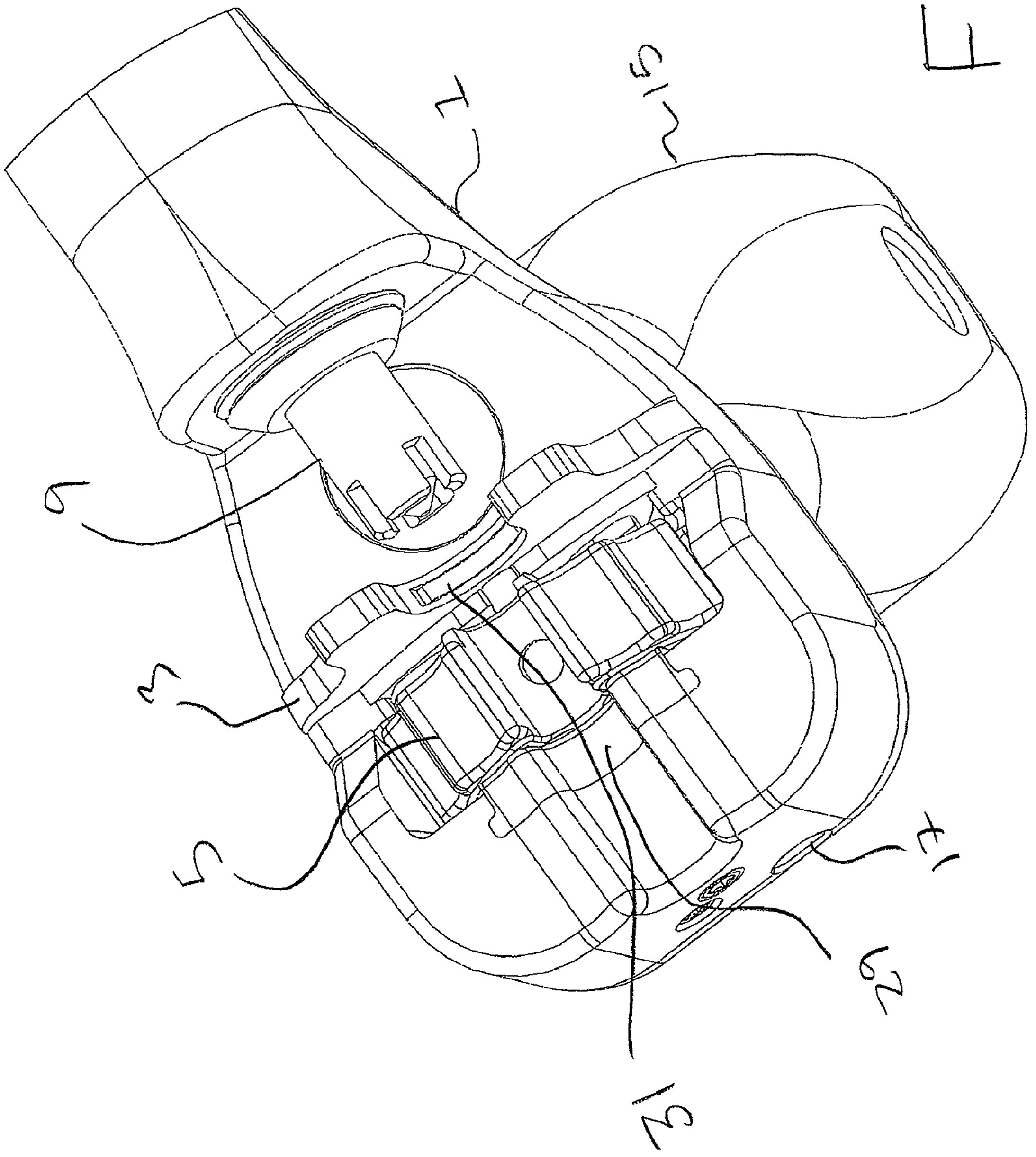
FIG. 9B is a schematic perspective view of a section of the chain tool of FIG. 1A, in accordance with an exemplary embodiment of the present inventive concept.

FIG. 9A is a schematic cross-sectional view of the roller chain 19 and the bridge 3 of the chain tool 10 of FIG. 1A, in accordance with an exemplary embodiment of the present inventive concept. FIG. 9B is a schematic perspective view of a section of the chain tool 10 of FIG. 1A, in accordance with an exemplary embodiment of the present inventive concept. In FIGS. 9A and 9B, the magnet 31 is positioned on the bridge 3 where the roller 40 of the roller chain 19 is positioned during chain pin extraction and insertion operations. The magnet 31 is used to hold the roller 40 in place ensuring the roller chain 19 is aligned concentrically with the pin 7 and the anvil of the anvil wheel 5.

The installation of a master pin 41 using the chain tool 10 will be described hereinafter.

Figure 10A:
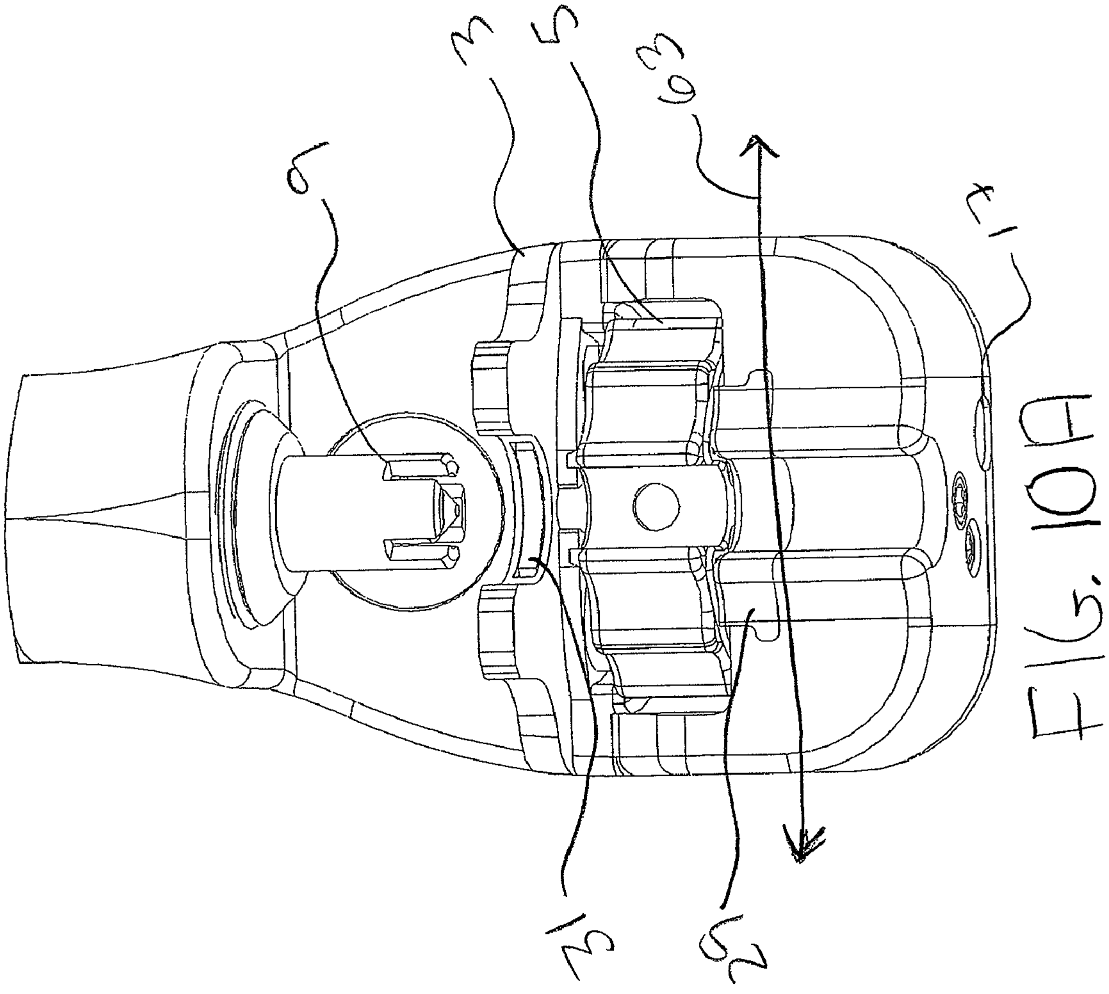
FIG. 10A is schematic perspective view of a method of installing a master pin using the chain tool of FIG. 1A, in accordance with an exemplary embodiment of the present inventive concept.
Figure 10B:
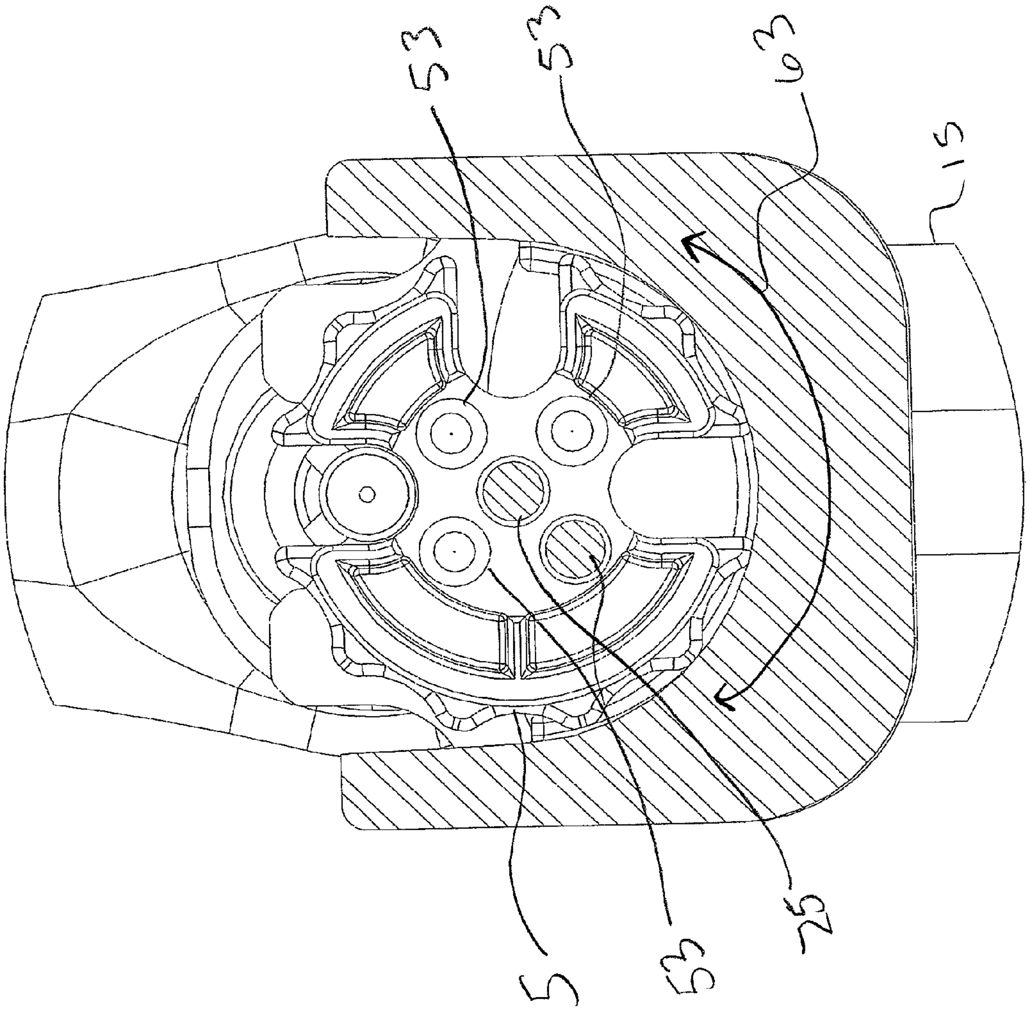
FIG. 10B is a schematic partially cut-away cross-sectional and perspective view of the method of installing the master pin using the chain tool of FIG. 1A, in accordance with an exemplary embodiment of the present inventive concept.

FIG. 10A is schematic perspective view of a method of installing the master pin 41 using the chain tool 10 of FIG. 1A, in accordance with an exemplary embodiment of the present inventive concept. FIG. 10B is a schematic partially cut-away cross-sectional and perspective view of the method of installing the master pin 41 using the chain tool 10 of FIG. 1A, in accordance with an exemplary embodiment of the present inventive concept. In FIGS. 10A and 10B, the anvil wheel 5 is rotated to the setting of the anvil wheel 5 that matches the chain that is being assembled. For example, if the master pin 41 on a ten speed chain is being installed, the anvil wheel 5 is rotated so that the ten speed anvil 51 is at the top position of the anvil wheel 5. The anvil wheel 5 may be rotated as indicated by arrow 63. The detent indexing of the anvil wheel 5 aligns the selected anvil with the bridge 3 and the pin 7.

Figure 11A:
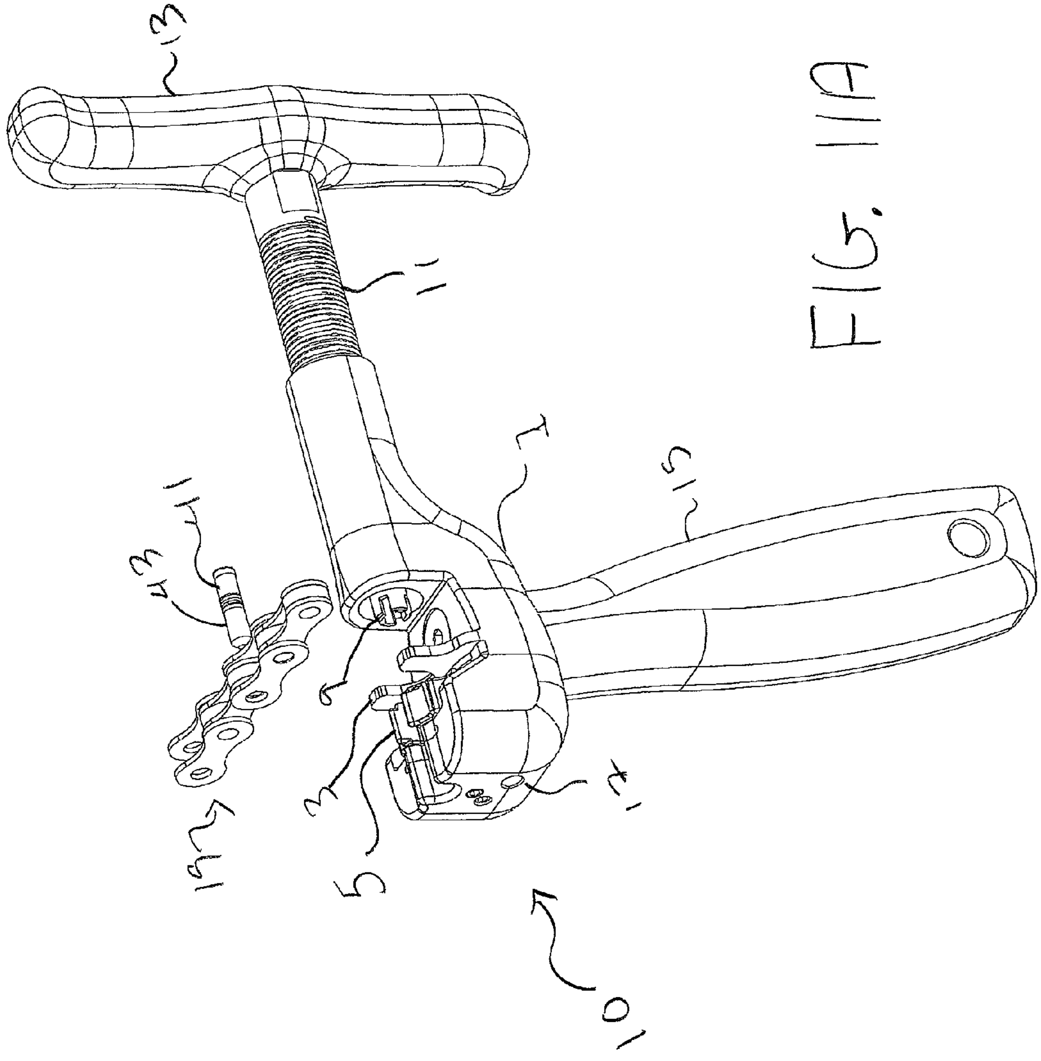
FIGS. 11A and 11B are schematic perspective views illustrating the method of installing a master pin using the chain tool of FIG. 1A, in accordance with an exemplary embodiment of the present inventive concept.
Figure 11B:
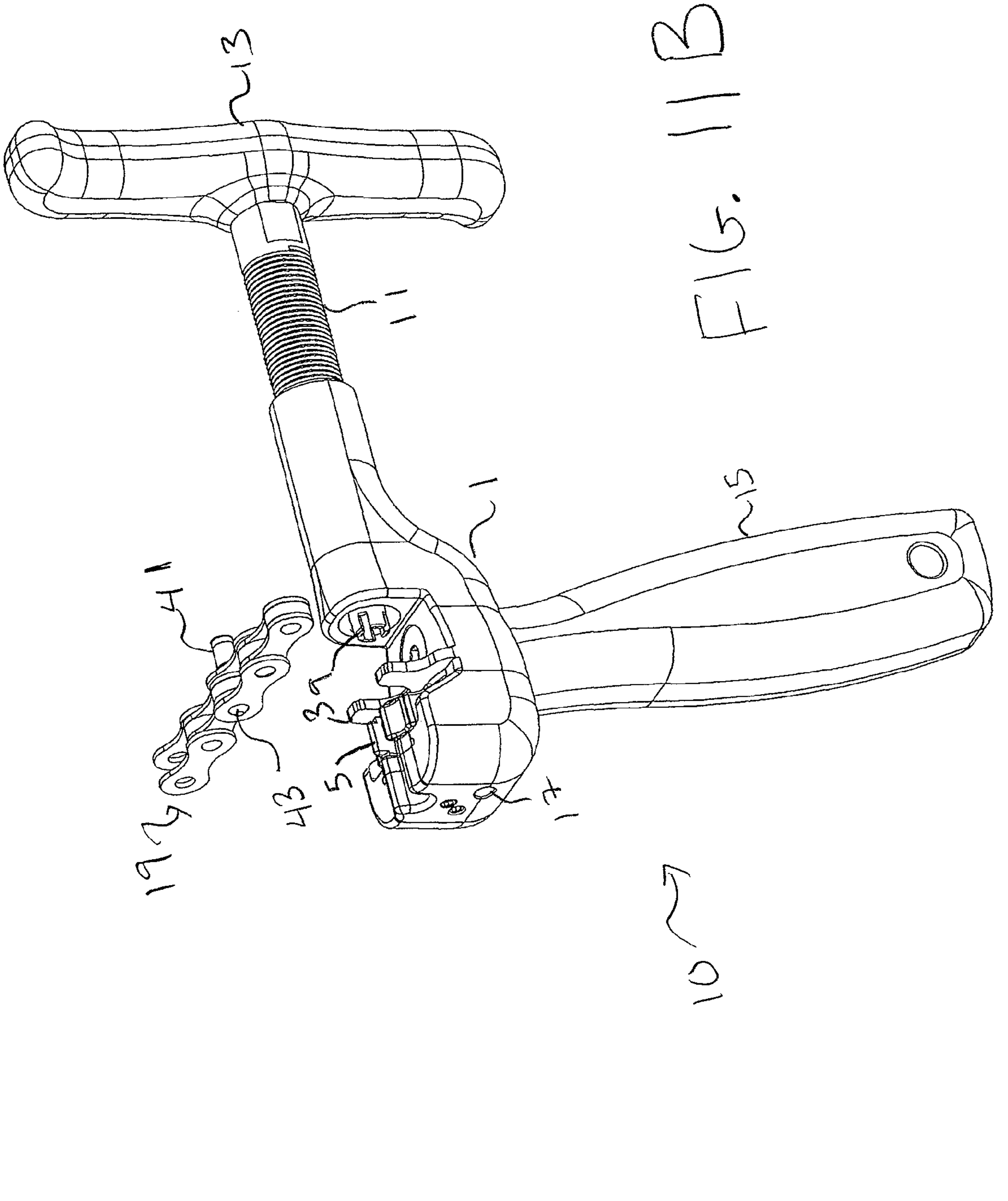

FIGS. 11A and 11B are schematic perspective views illustrating the method of installing the master pin 41 using the chain tool 10 of FIG. 1A, in accordance with an exemplary embodiment of the present inventive concept. In FIG. 11A, the master pin 41 and guide 43 are aligned with the roller chain 19. In FIG. 11B, the guide 43 is inserted into the roller chain 19.

Figure 12B:
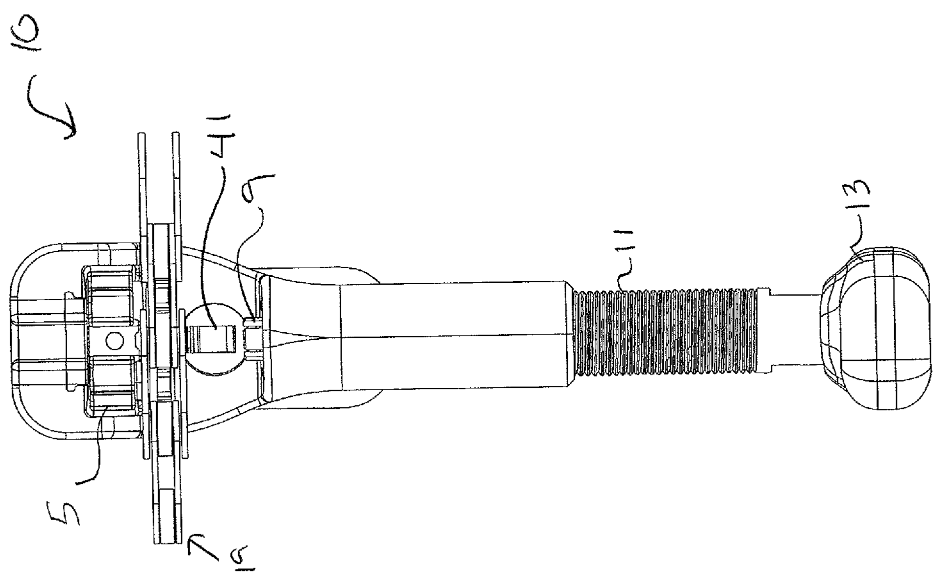
FIGS. 12A and 12B are schematic perspective views and FIG. 12C is a schematic cross-sectional view illustrating a method of installing a master pin using the chain tool of FIG. 1A, in accordance with an exemplary embodiment of the present inventive concept.
Figure 12A:
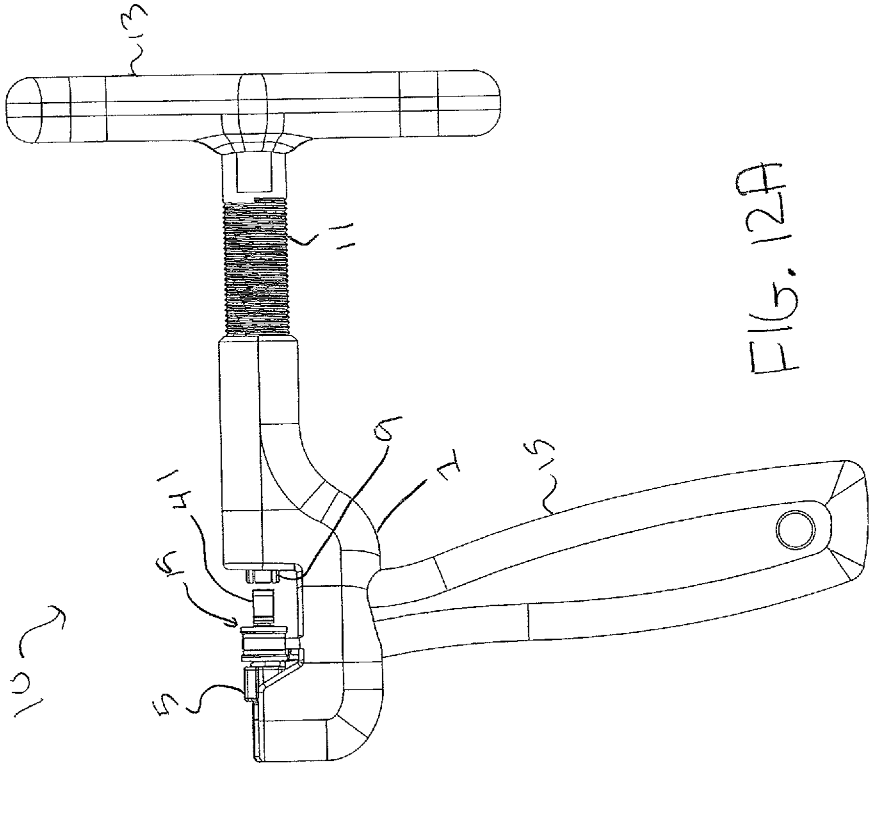
Figure 12C:
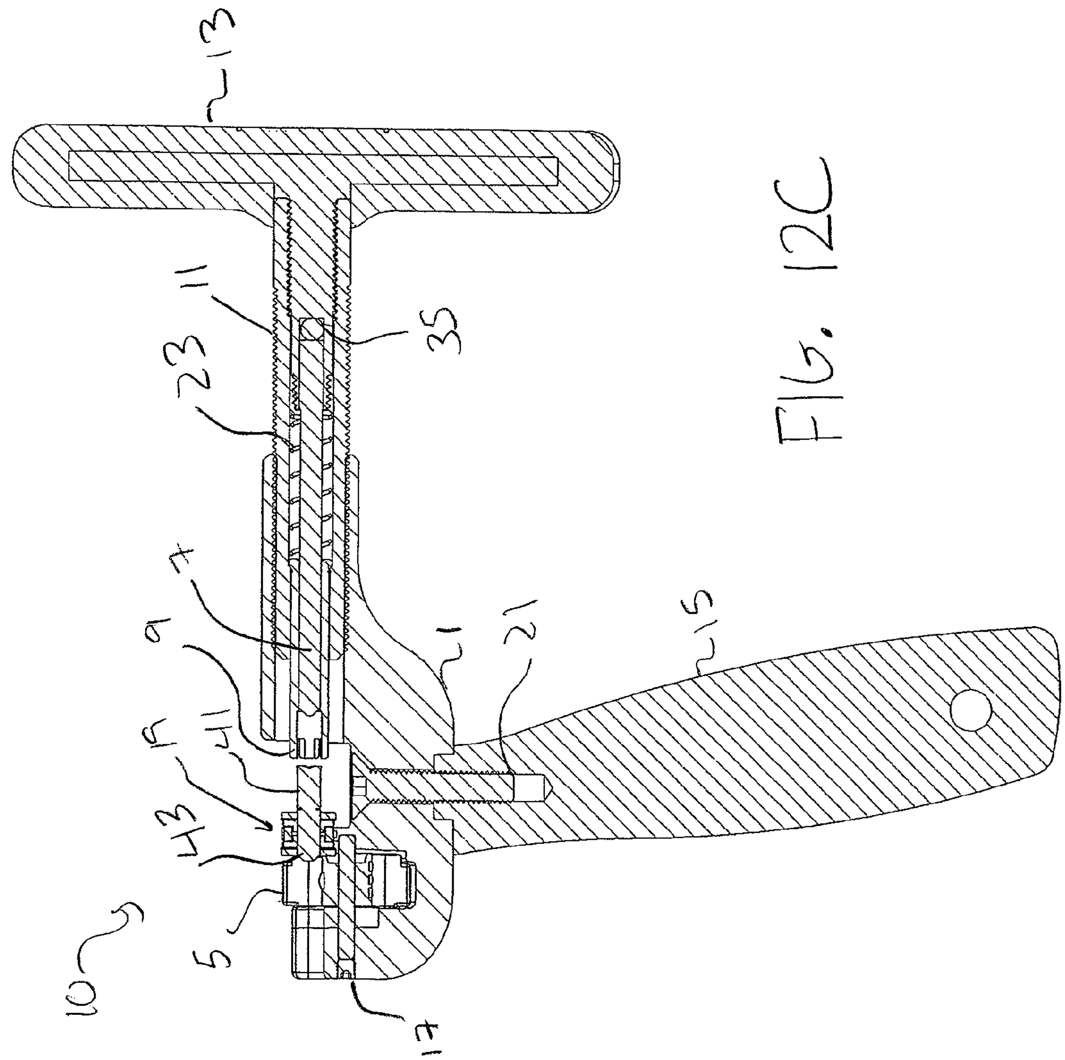

FIGS. 12A and 12B are schematic perspective views and FIG. 12C is a schematic cross-sectional view illustrating the method of installing a master pin using the chain tool of FIG. 1A, in accordance with an exemplary embodiment of the present inventive concept. In FIGS. 12A, 12B and 12C, the roller chain 19 is positioned of the bridge 3 of the chain tool 10 with the master pin 41 centered. The roller chain 19 is held onto the bridge 3 by the precision spacing between the anvil wheel 5 and the bridge 3. In addition, the magnet 31 acts on the roller 40 of the roller chain 19 with the guide 43 extended through the roller chain 19.

FIG. 13A, 14A, 15A and 16A are schematic cross-sectional views and FIG. 13B, 14B, 15B and 16B are schematic perspective views illustrating the method of installing the master pin using the chain tool of FIG. 1A, in accordance with an exemplary embodiment of the present inventive concept.

Figure 13B:
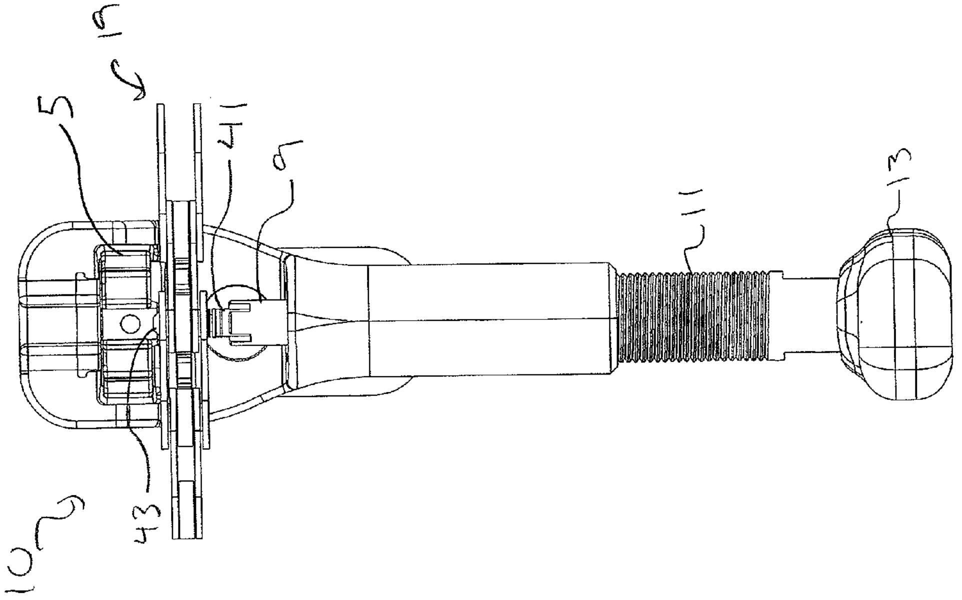
FIG. 13B, 14B, 15B and 16B are schematic perspective views illustrating a method of installing the master pin using the chain tool of FIG. 1A, in accordance with an exemplary embodiment of the present inventive concept.
Figure 13A:
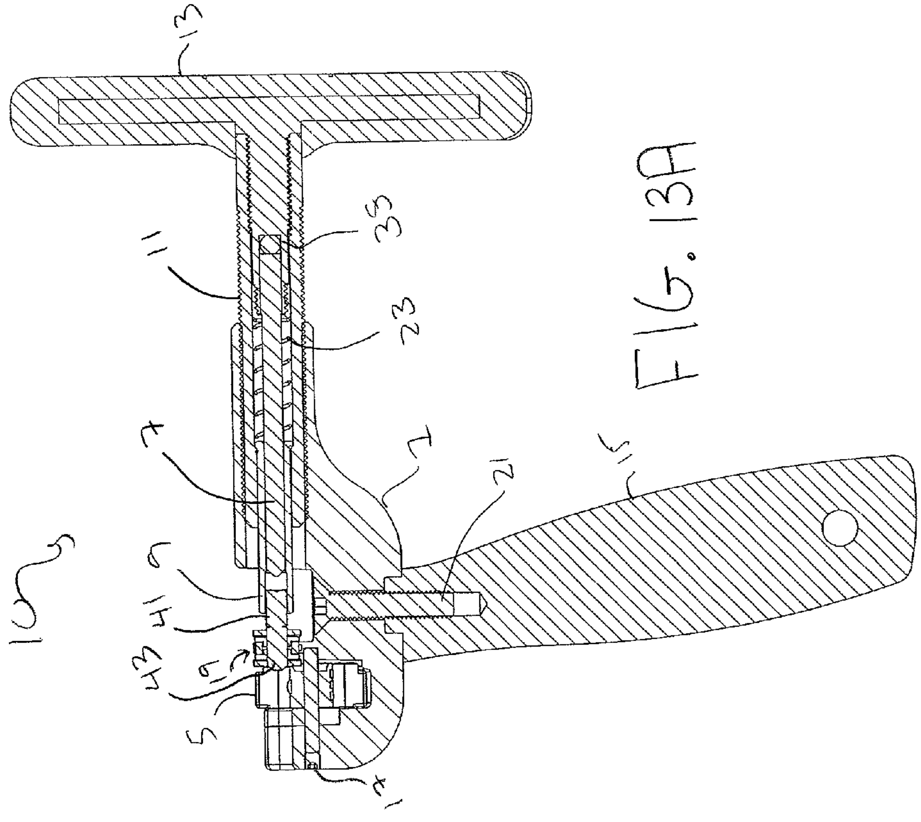
FIG. 13A, 14A, 15A and 16A are schematic cross-sectional views
Figure 14B:
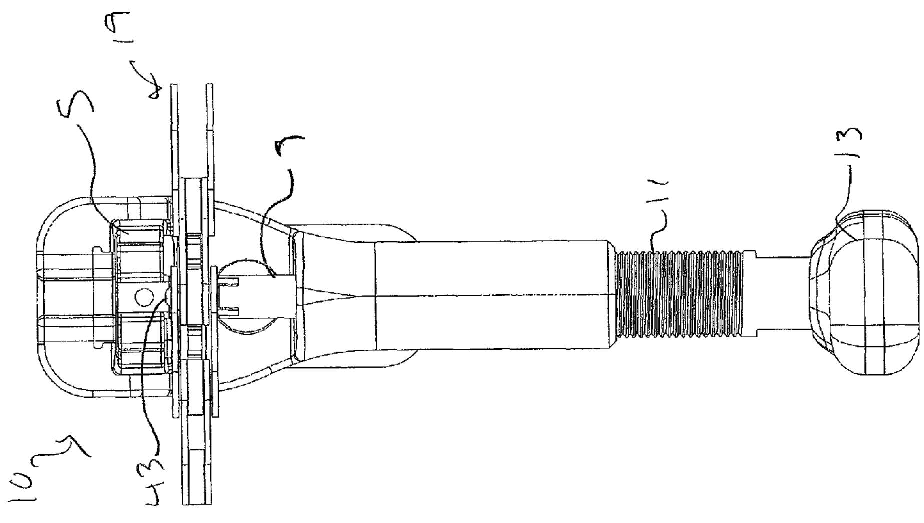
Figure 14A:
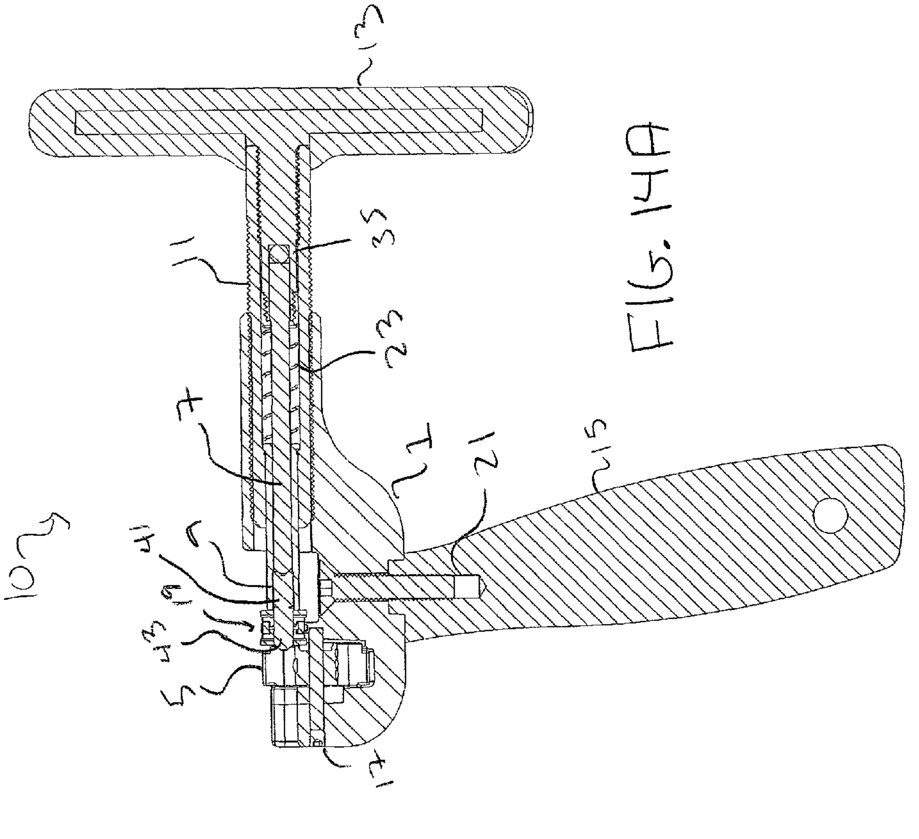

In FIGS. 13A and 13B, the drive handle 13 is turned, which moves the drive screw 11 axially toward the roller chain 19. As the drive screw 11 moves axially, the alignment sleeve 9 slides over and surrounds the master pin 41. In FIGS. 13A and 13B, the chain tool pin 10, the alignment sleeve 9 and the drive screw 11 move together and their positions relative to one another are fixed. This movement continues until the front face of the alignment sleeve 9 interfaces with the outer link 39 of the roller chain 19, as illustrated in FIGS. 14A and 14B.

Figure 15B:
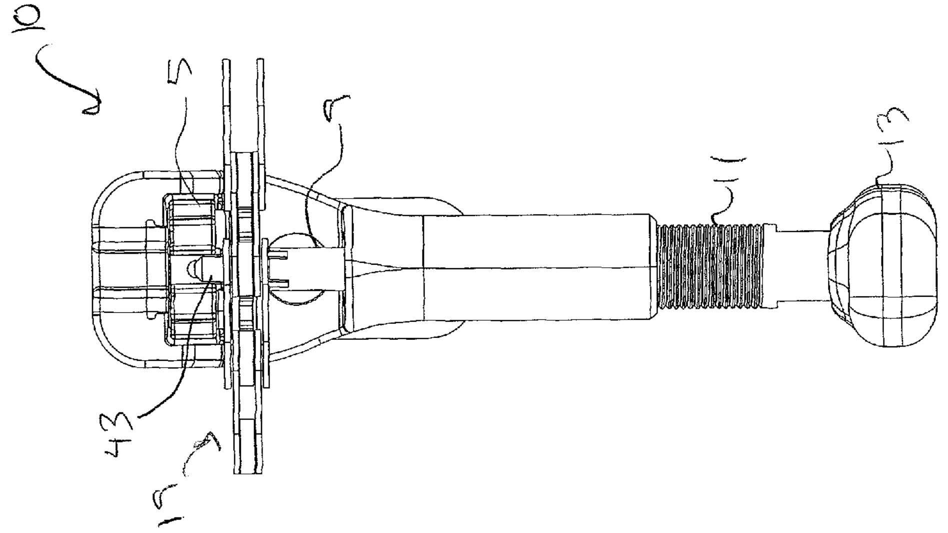
Figure 15A:
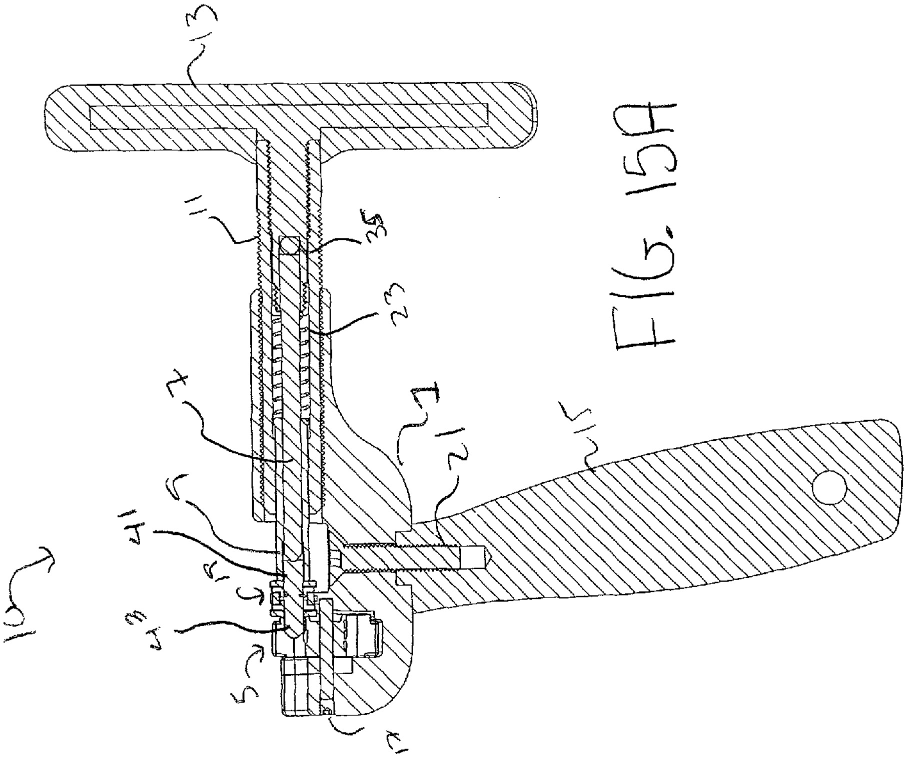
Figure 16B:
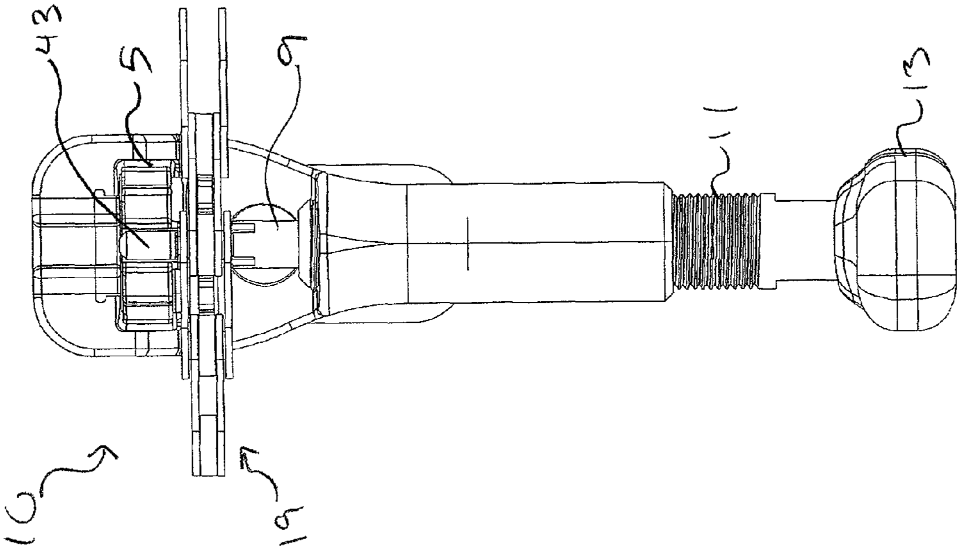
Figure 16A:
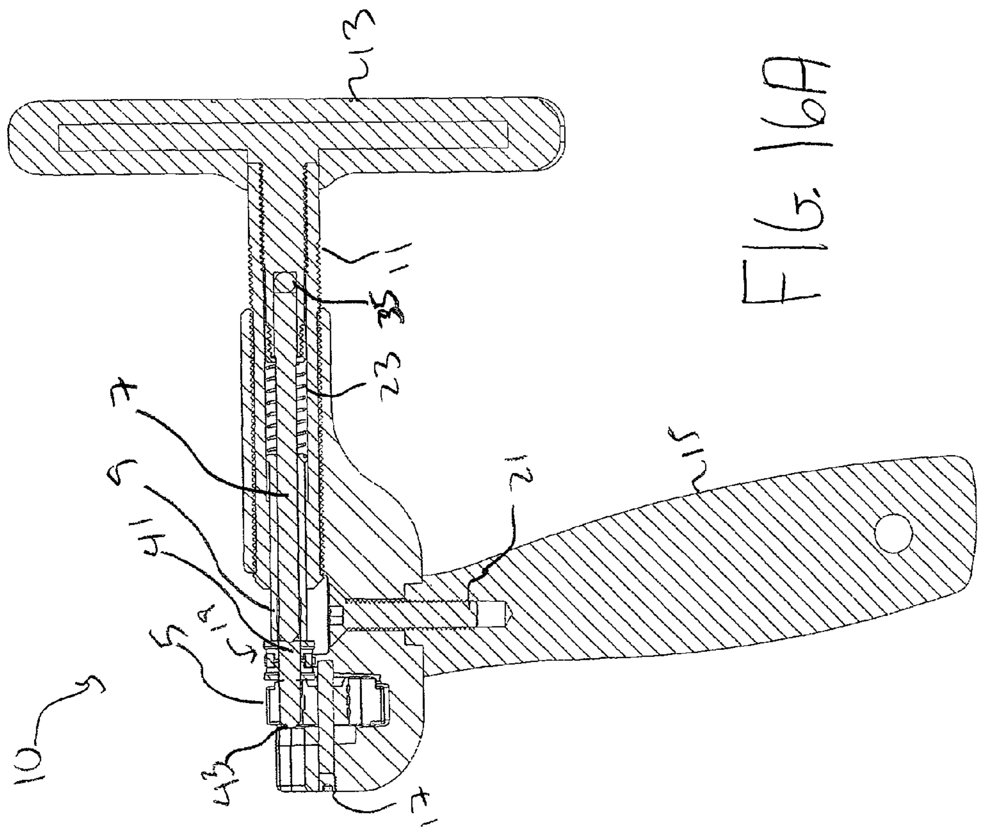
Figure 17B:
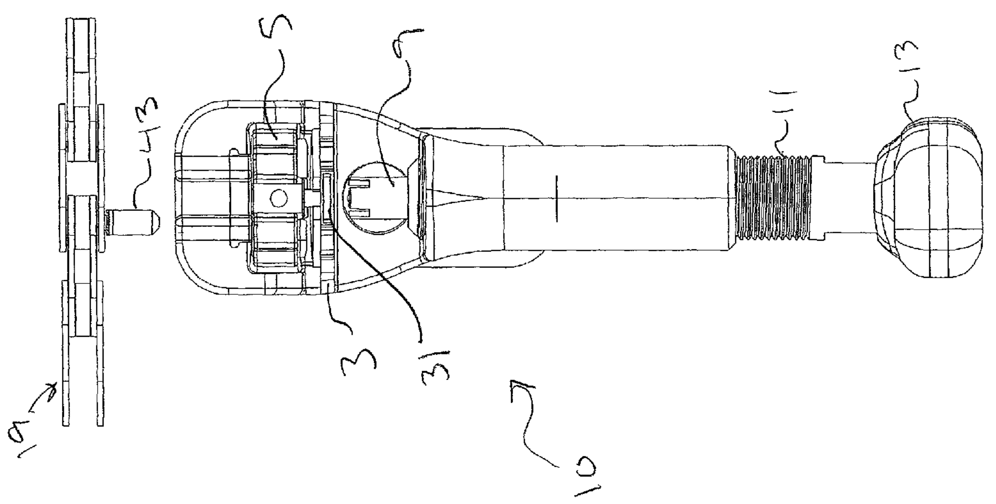
FIGS. 17A, 17B, 18A, 18B, 19A and 19B are schematic perspective views illustrating a method of installing a master pin using the chain tool of FIG. 1A, in accordance with an exemplary embodiment of the present inventive concept.
Figure 17A:
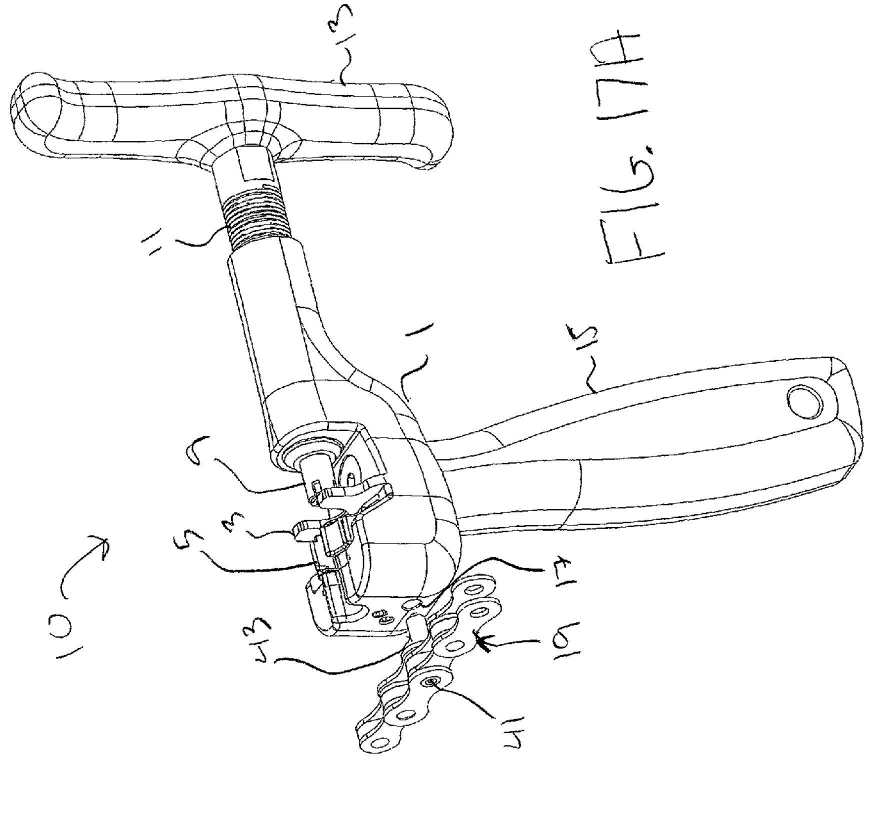
Figure 18B:
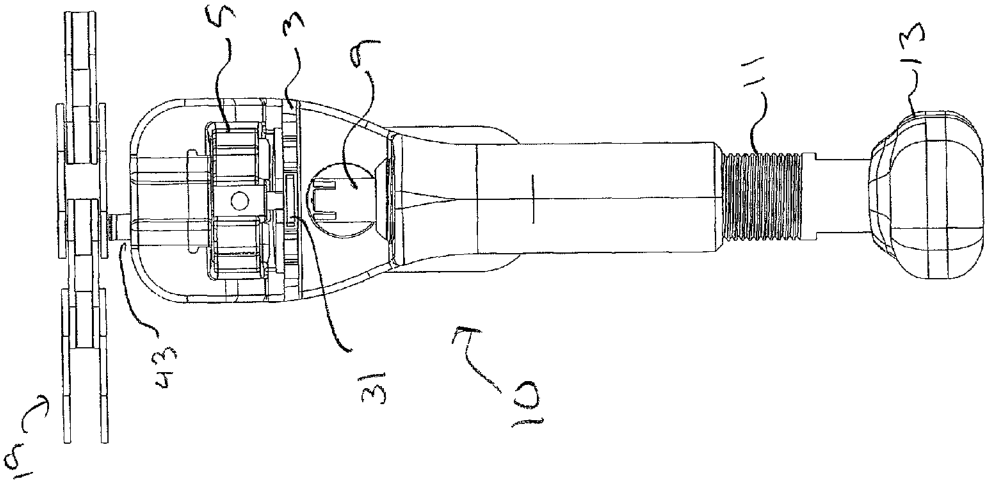
Figure 18A:
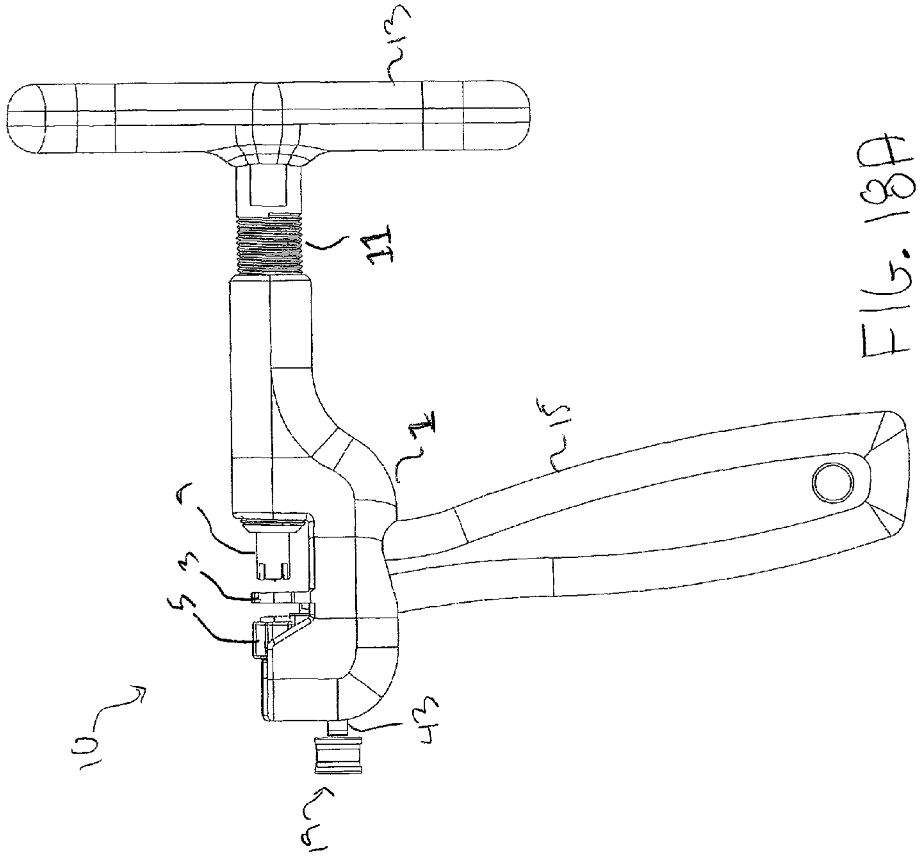

In FIGS. 15A and 15B, the alignment sleeve 9 no longer moves axially with the pin 7 and the drive screw 11. As the drive screw 11 is turned by the drive handle 13, the pin 7 and drive screw 11 begin to slide through and over the alignment sleeve. The alignment sleeve 9 is prevented from moving by the face of the roller chain 19. The pin 7 begins to apply force to the master pin 41 and begins pressing the master pin into the roller chain 19. As the pin 7 and the drive screw 11 slide through and over the alignment sleeve, respectively, the alignment sleeve return spring 23 is compressed. This movement continues until the master pin 41 is fully pressed into the roller chain 19 with the master pin 41 centered between the outer links 39 of the roller chain 19, as illustrated in FIGS. 16A and 16B.

FIGS. 17A, 17B, 18A, 18B, 19A and 19B are schematic perspective views illustrating the method of installing the master pin 41 using the chain tool 10 of FIG. 1A, in accordance with an exemplary embodiment of the present inventive concept.

Figure 19B:
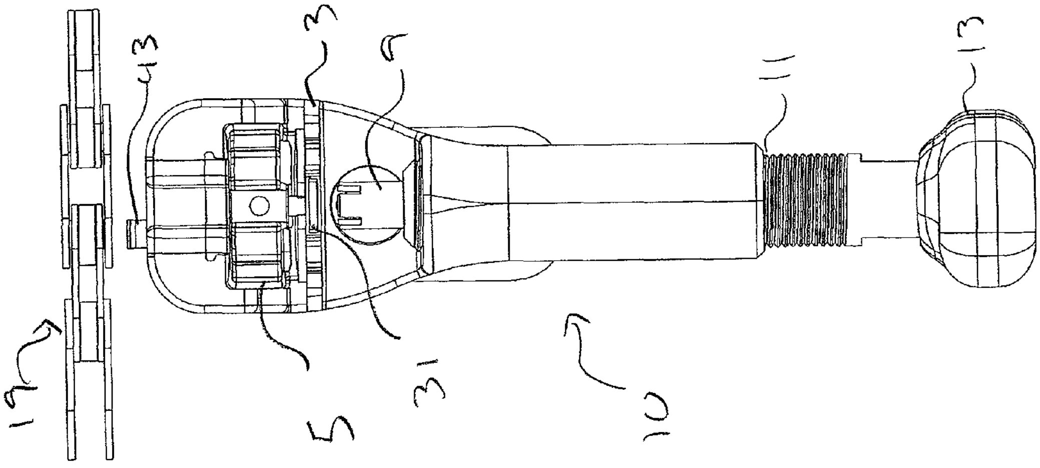
Figure 19A:
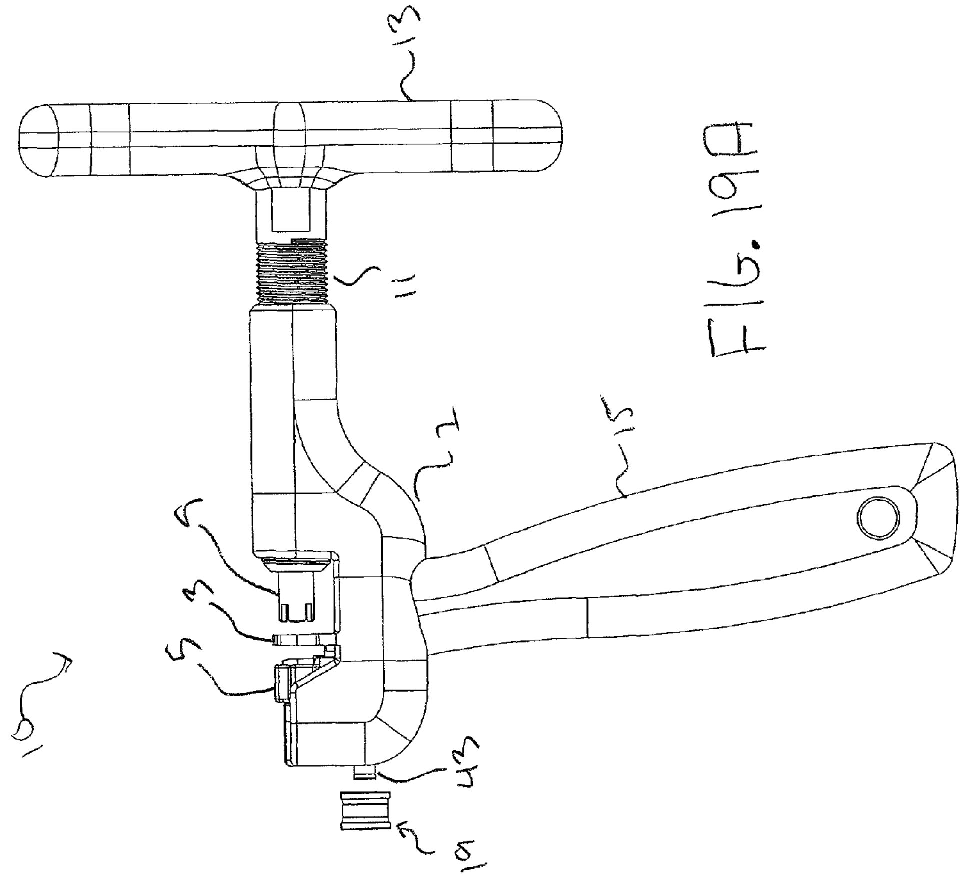

Once the master pin 41 is installed, the drive screw 11 is unscrewed, which retracts the pin 7 and permits the alignment sleeve 9 to return to its forward position, pushed forward by the alignment sleeve return spring 23. In FIGS. 17A, 17B, 18A and 18B, the roller chain 19 is removed from the chain tool 10 and the guide 43 of the master pin 41 is positioned into the hole 17 on the front of the main body 1. The hole 17 surrounds the guide 43. By tilting the chain tool 10 relative to the roller chain 19 the guide 43 is separated from the master pin 41, leaving only the master pin 41 in the roller chain 19, as illustrated in FIGS. 19A and 19B.

Figure 20A:
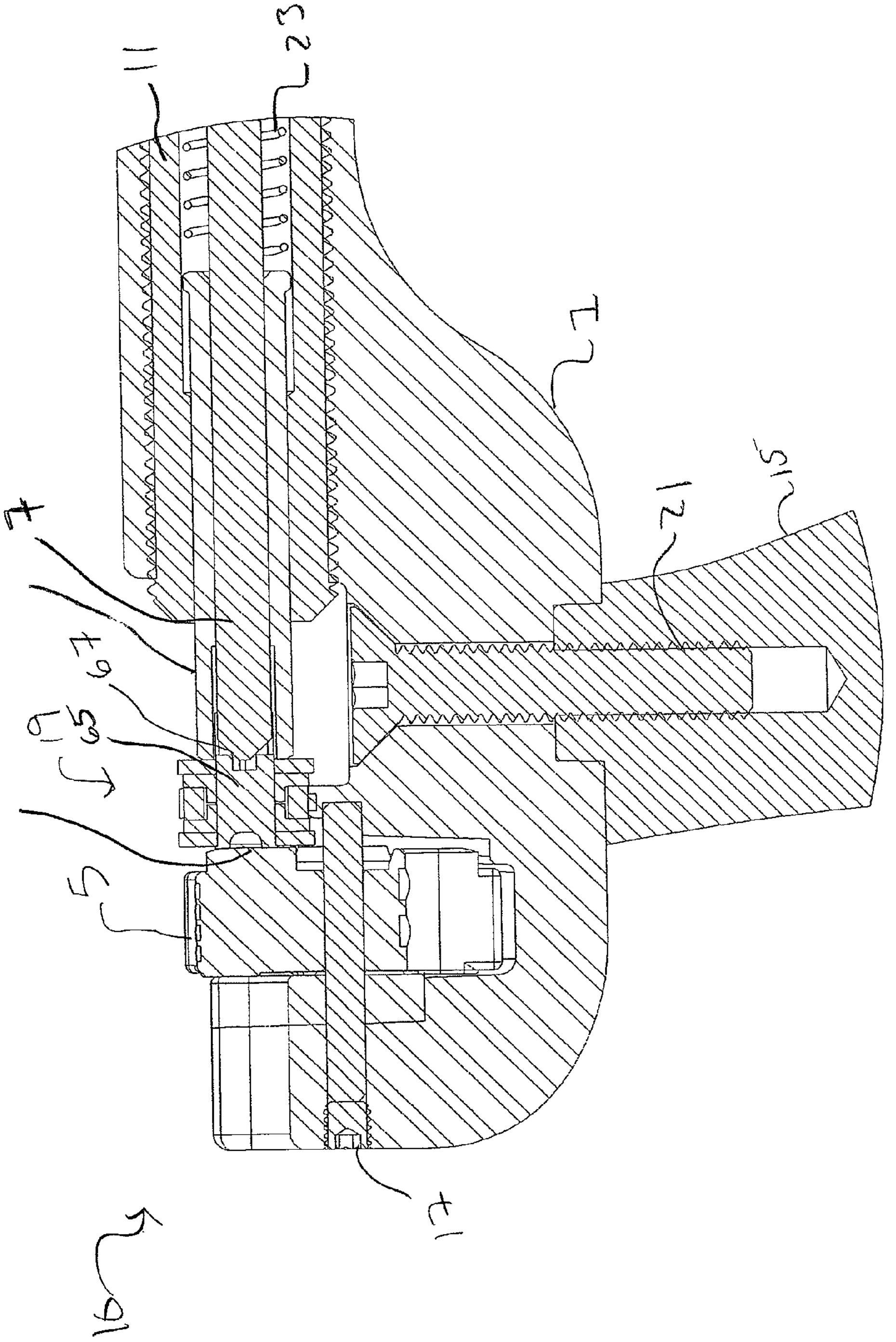
FIGS. 20A and 20B are schematic cross-sectional views illustrating a portion of a method of installing a master pin using the chain tool of FIG. 1A, in accordance with an exemplary embodiment of the present inventive concept.
Figure 20B:
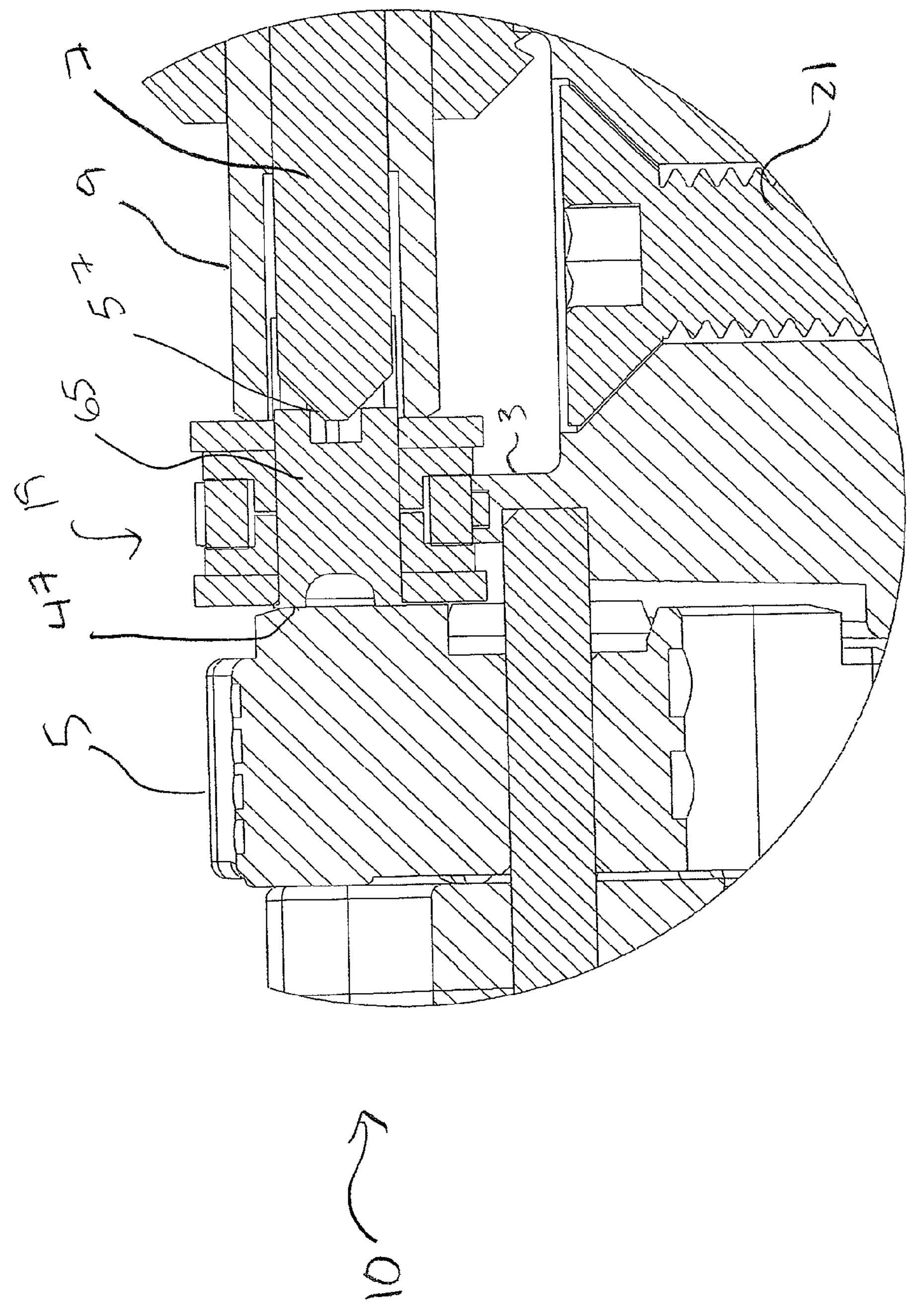

FIGS. 20A and 20B are schematic cross-sectional views illustrating a portion of the method of installing a master pin 65 using the chain tool of FIG. 1A, in accordance with an exemplary embodiment of the present inventive concept. FIGS. 20A and 20B illustrate an additional step for installing a master pin 65 in a chain for an eleven-speed bicycle. After removing the guide 43, the anvil wheel 5 is rotated so that the eleven-speed flare anvil 47 is at the top position of the anvil wheel 5. The roller chain 19 is returned to the bridge 3 of the chain tool 10 with the guide 43 end facing the pin 7. The roller chain 19 is held onto the bridge 3 by the precision spacing between the anvil wheel 5 and the bridge 3, as well as by the magnet 31. As illustrated in FIGS. 20A and 20B, the drive handle 13 is turned and the pin 7 is advanced into the master pin 65. Because the eleven-speed flare anvil 47 is solid, the pin 7, having a special chamfered tip 67, is unable to move, causing the master pin 65 to be flared outward locking it into the roller chain 19.

Figure 21B:
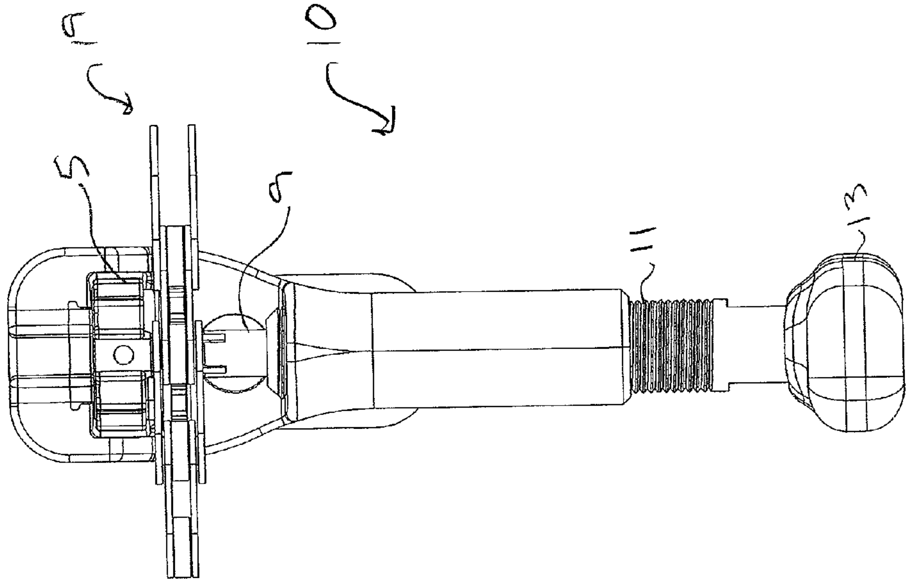
FIGS. 21B, 22B and 23B are schematic perspective views illustrating a method of extracting the master pin using the chain tool of FIG. 1A, in accordance with an exemplary embodiment of the present inventive concept.
Figure 21A:
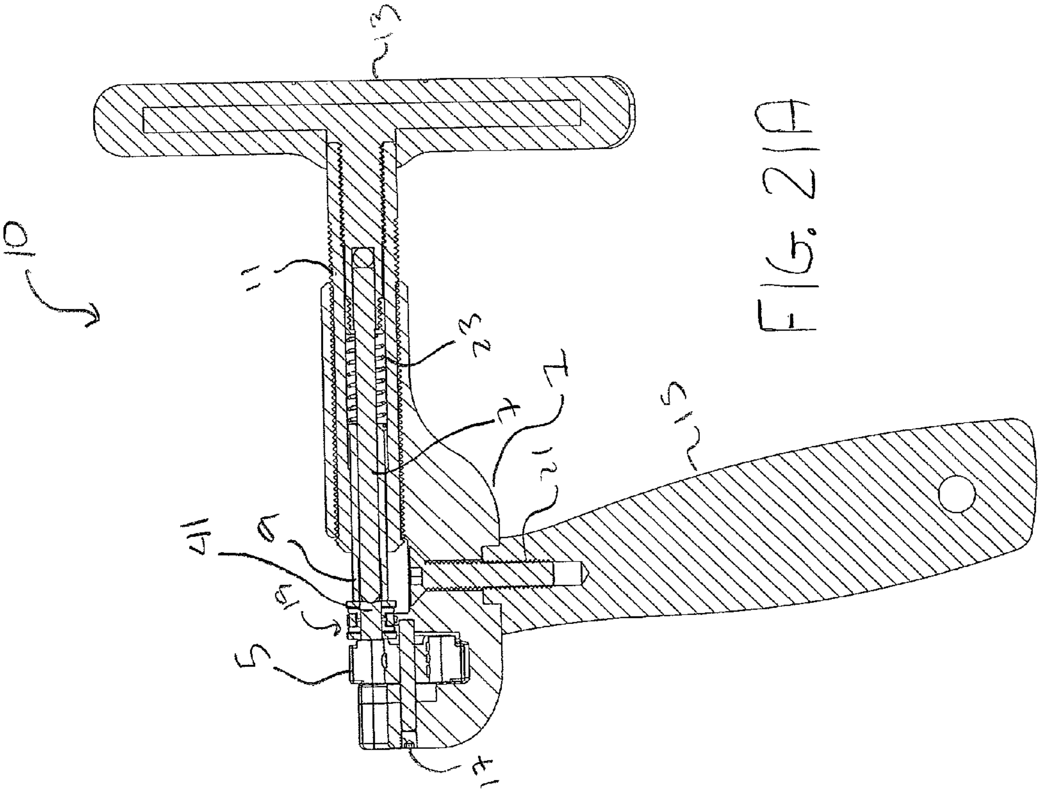
FIGS. 21A, 22A and 23A are schematic cross-sectional view
Figure 22B:
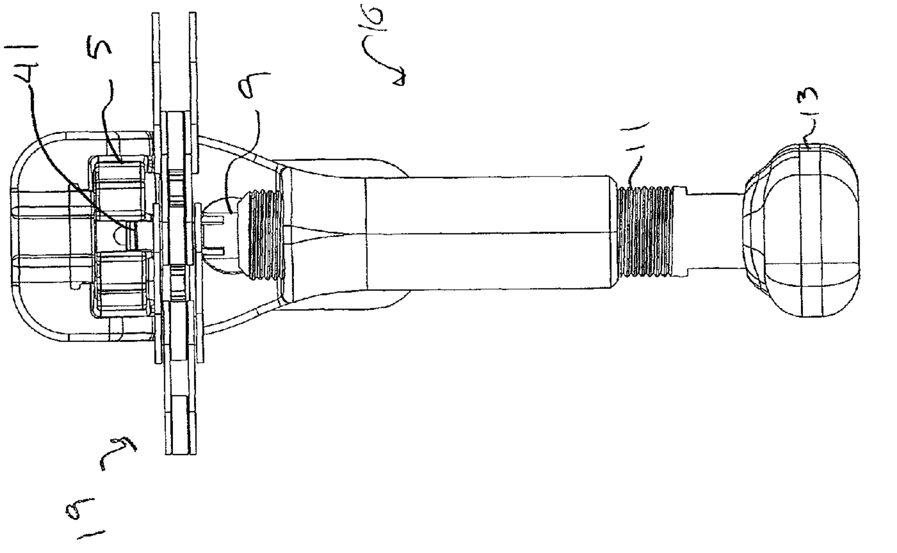
Figure 22A:
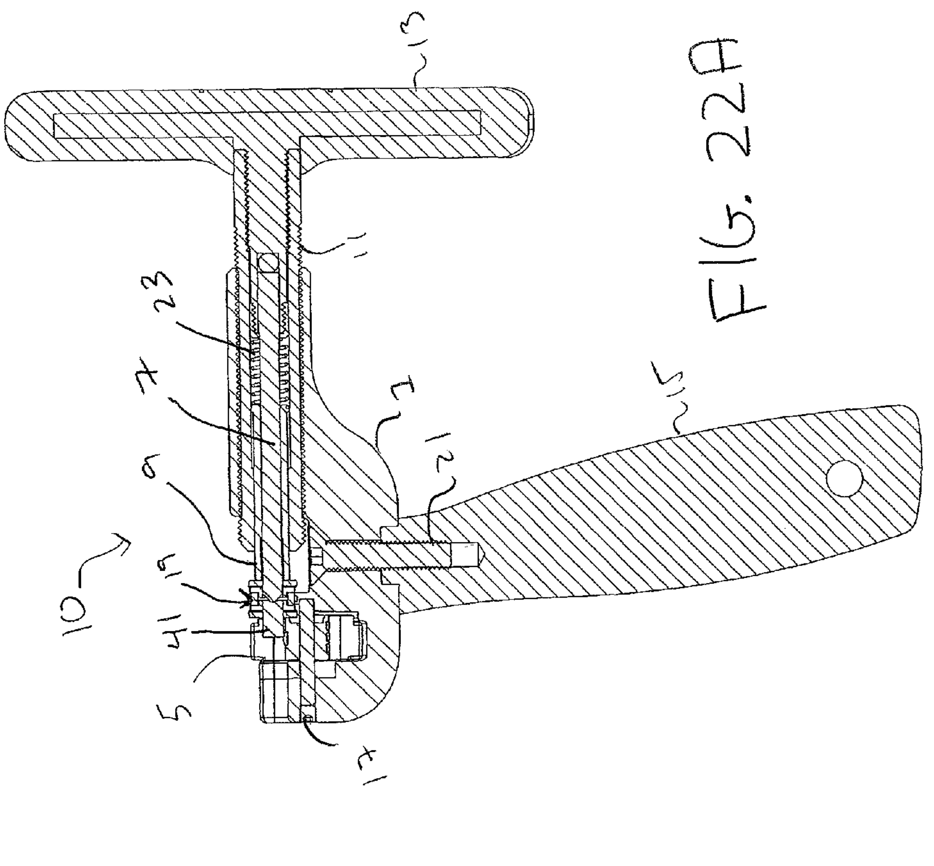
Figure 23B:
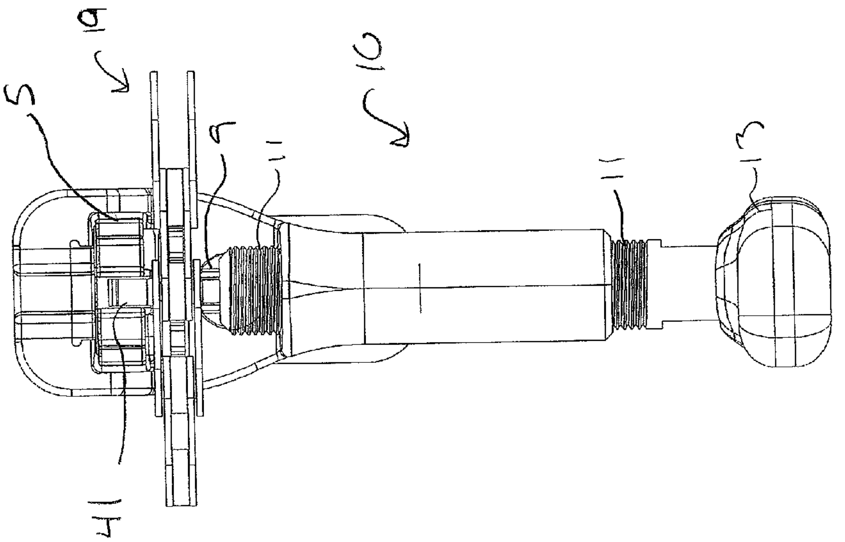
Figure 23A:
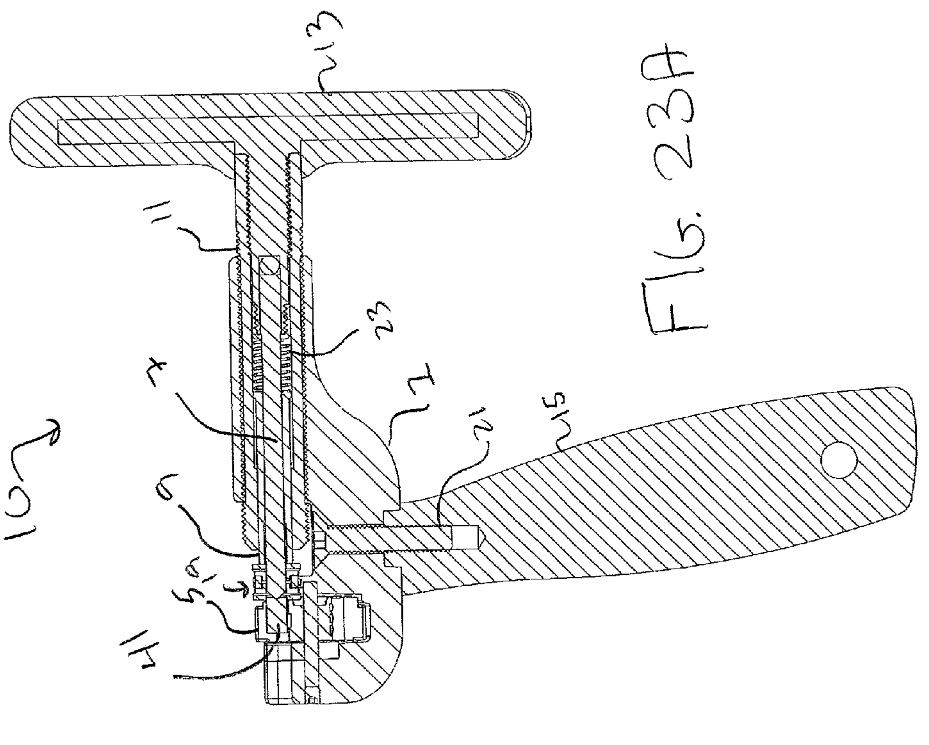

FIGS. 21A, 22A and 23A are schematic cross-sectional views and FIGS. 21B, 22B and 23B are schematic perspective views illustrating the method of extracting the master pin using the chain tool of FIG. 1A, in accordance with an exemplary embodiment of the present inventive concept. In disassembling the roller chain 19, the process is similar to installing the master pin 41. The anvil wheel 5 is rotated to the setting that matches the chain that is being disassembled. Then, the roller chain 19 is positioned on the bridge 3 and held in place by the precision spacing between the bridge 3 and the anvil wheel 5, as well as the magnet 31. The drive screw 11 is then turned moving the drive screw 11 towards the roller chain 19. The alignment sleeve 9 is stopped by the face of the roller 19 chain, as illustrated in FIGS. 21A and 21B. The pin 7 and drive screw 11 press the master pin 41 out of the roller chain 19. The alignment sleeve 9 guides and supports the pin 7 preventing bending and breaking of the master pin 41.

Although the present inventive concepts have been described in connection with the exemplary embodiments illustrated in the accompanying drawings, it is not limited thereto. It will be apparent to those skilled in the art that various substitution, modifications and changes may be thereto without departing from the scope and spirit of the present inventive concepts.

What is claimed is:

1. A tool for inserting and extracting pins of roller chains, comprising:

a body having a bridge adapted to engage a chain;

a drive screw assembly coupled to the main body on a first side of the bridge, the drive screw assembly comprising a drive screw which is rotatable to provide a force used in extracting or inserting a pin of a roller chain and a pin mounted concentrically within the drive screw; and a rotatable backing wheel coupled to the main body on a second side of the bridge, the rotatable backing wheel comprising multiple channels such that the multiple channels correspond to different roller chains having different sizes.

2. The tool of claim 1, wherein the rotatable backing wheel comprises a first channel providing spacing for a first roller chain of a first size, a second channel providing spacing for a second roller chain of a second size and a third channel providing spacing for a third roller chain of a third size.

3. The tool of claim 2, wherein the rotatable backing wheel comprises a solid anvil provided to flare a pin of the third roller chain.

4. The tool of claim 1, wherein the tool further comprises a ball and a spring, and the rotatable backing wheel comprises multiple detents on a first side of the rotatable backing wheel for receiving the ball such that the rotatable backing wheel is rotatable to multiple indexed positions.

5. The tool of claim 1, wherein the bridge comprises a magnet.

6. The tool of claim 1, wherein the drive screw assembly further comprises an alignment sleeve mounted concentrically within the drive screw, wherein the alignment sleeve surrounds the pin.

7. The tool of claim 6, wherein the alignment sleeve guides and supports the pin up to a face of a roller chain.

8. The tool of claim 6, wherein the pin is rotatable relative to the drive screw and alignment sleeve.

9. The tool of claim 6, wherein the alignment sleeve is movable axially relative to the drive screw and has limited outward movement from the drive screw assembly.

10. The tool of claim 6, wherein the alignment sleeve is limited from moving inward in the drive screw assembly by an alignment sleeve return spring.

11. The tool of claim 1, wherein the pin is fixed to the drive screw coupling the motion of the pin and the drive screw.

12. A tool for inserting and extracting pins of roller chains, comprising:

- a body having a bridge adapted to engage a chain; and
- a drive screw assembly coupled to the main body, the drive screw assembly comprising:
  - a drive screw which is rotatable to provide a force used in extracting or inserting a pin of a roller chain;
  - a pin mounted concentrically within the drive screw; and
  - an alignment sleeve mounted concentrically within the drive screw, wherein the alignment sleeve surrounds the pin and wherein the alignment sleeve guides and supports the pin up to a face of a roller chain.

13. The tool of claim 12, wherein the pin is rotatable relative to the drive screw and alignment sleeve.

14. The tool claim 12, wherein the pin is fixed to the drive screw coupling the motion of the pin and the drive screw.

15. A tool for inserting and extracting pins of roller chains, comprising:

- a body having a bridge adapted to engage a chain; and
- a drive screw assembly coupled to the main body, the drive screw assembly comprising:
  - a drive screw which is rotatable to provide a force used in extracting or inserting a pin of a roller chain;
  - a pin mounted concentrically within the drive screw; and
  - an alignment sleeve mounted concentrically within the drive screw, wherein the alignment sleeve surrounds the pin and wherein the alignment sleeve is movable axially relative to the drive screw and has limited outward movement from the drive screw assembly.

16. The tool of claim 15, wherein the pin is rotatable relative to the drive screw and alignment sleeve.

17. The tool claim 15, wherein the pin is fixed to the drive screw coupling the motion of the pin and the drive screw.

18. A tool for inserting and extracting pins of roller chains, comprising:

- a body having a bridge adapted to engage a chain; and
- a drive screw assembly coupled to the main body, the drive screw assembly comprising:
  - a drive screw which is rotatable to provide a force used in extracting or inserting a pin of a roller chain;
  - a pin mounted concentrically within the drive screw; and
  - an alignment sleeve mounted concentrically within the drive screw, wherein the alignment sleeve surrounds the pin, and wherein the alignment sleeve is limited from moving inward in the drive screw assembly by an alignment sleeve return spring.

19. The tool of claim 18, wherein the pin is rotatable relative to the drive screw and alignment sleeve.

20. The tool claim 18, wherein the pin is fixed to the drive screw coupling the motion of the pin and the drive screw.

21. A tool for inserting and extracting pins of roller chains, comprising:

- a body having a bridge adapted to engage a chain; and
- a drive screw assembly coupled to the main body, the drive screw assembly comprising:
  - a drive screw which is rotatable to provide a force used in extracting or inserting a pin of a roller chain;
  - a pin mounted concentrically within the drive screw; and
  - an alignment sleeve mounted concentrically within the drive screw, wherein the alignment sleeve surrounds the pin, and wherein the bridge comprises a magnet.

22. The tool of claim 21, wherein the pin is rotatable relative to the drive screw and alignment sleeve.

23. The tool of claim 21, wherein the pin is fixed to the drive screw coupling the motion of the pin and the drive screw.

* * * * *